US012620091B2

(12) United States Patent
Dawant et al.

(10) Patent No.: US 12,620,091 B2
(45) Date of Patent: May 5, 2026

(54) METHODS OF AUTOMATIC SEGMENTATION OF ANATOMY IN ARTIFACT AFFECTED CT IMAGES WITH DEEP NEURAL NETWORKS AND APPLICATIONS OF SAME

(71) Applicant: VANDERBILT UNIVERSITY, Nashville, TN (US)

(72) Inventors: Benoit M. Dawant, Nashville, TN (US); Jianing Wang, Nashville, TN (US); Jack H. Noble, Nashville, TN (US); Robert F. Labadie, Nashville, TN (US)

(73) Assignee: VANDERBILT UNIVERSITY, Nashville, TN (US)

( * ) Notice: Subject to any disclaimer, the term of this patent is extended or adjusted under 35 U.S.C. 154(b) by 378 days.

(21) Appl. No.: 18/288,058

(22) PCT Filed: Apr. 26, 2022

(86) PCT No.: PCT/US2022/026262
§ 371 (c)(1),
(2) Date: Oct. 24, 2023

(87) PCT Pub. No.: WO2022/232084
PCT Pub. Date: Nov. 3, 2022

(65) Prior Publication Data
US 2024/0202914 A1 Jun. 20, 2024

Related U.S. Application Data

(63) Continuation-in-part of application No. 17/266,180, filed as application No. PCT/US2019/045221 on Aug. 6, 2019, now Pat. No. 11,763,502.
(Continued)

(51) Int. Cl.
G06T 7/00 (2017.01)
G06T 3/02 (2024.01)
(Continued)

(52) U.S. Cl.
CPC .............. G06T 7/0012 (2013.01); G06T 3/02 (2024.01); G06T 3/18 (2024.01); G06T 7/30 (2017.01);
(Continued)

(58) Field of Classification Search
CPC ........... G06T 7/0012; G06T 3/02; G06T 3/18; G06T 7/30; G06T 17/20;
(Continued)

(56) References Cited

U.S. PATENT DOCUMENTS

| | | | |
|---|---|---|---|
| 10,699,410 B2 | 6/2020 | Pheiffer et al. | |
| 2005/0251029 A1 | 11/2005 | Khamene et al. | |

(Continued)

FOREIGN PATENT DOCUMENTS

| | | |
|---|---|---|
| WO | 2020206135 A1 | 10/2020 |

OTHER PUBLICATIONS

Korean Intellectual Property Office (ISR/KR), "International Search Report for PCT/US2022/026262", Korea, Aug. 12, 2022.
(Continued)

*Primary Examiner* — Van D Huynh
(74) *Attorney, Agent, or Firm* — troutman Pepper Locke; Tim Tingkang Xia, Esq.

(57) ABSTRACT

Methods and systems for segmentation of structures of interest (SOI) in a CT image post-operatively acquired with an implant user in a region of interest in which an implant is implanted. The method includes inputting the post-operatively acquired CT (Post-CT) image to trained networks to generate a dense deformation field (DDF) from the input Post-CT image to an atlas image; and warping a segmenta-
(Continued)

INTERFACE tion mesh of the SOI in the atlas image to the input Post-CT image using the DDF so as to generate the segmentation mesh of the SOI in the input Post-CT image, wherein the segmentation mesh of the SOI in the atlas image is generated by applying an active shape model-based method to the atlas image.

36 Claims, 7 Drawing Sheets

Related U.S. Application Data

(60) Provisional application No. 63/179,655, filed on Apr. 26, 2021, provisional application No. 62/714,831, filed on Aug. 6, 2018.

(51) Int. Cl.

| | |
|---|---|
| *G06T 3/18* | (2024.01) |
| *G06T 7/30* | (2017.01) |
| *G06T 17/20* | (2006.01) |
| *G06V 10/25* | (2022.01) |

(52) U.S. Cl.
CPC .............. *G06T 17/20* (2013.01); *G06V 10/25* (2022.01); *G06T 2207/10081* (2013.01); *G06T 2207/20132* (2013.01); *G06T 2207/30016* (2013.01); *G06T 2207/30048* (2013.01)

(58) Field of Classification Search
CPC . G06T 2207/10081; G06T 2207/20132; G06T 2207/30016; G06T 2207/30048; G06V 10/25

See application file for complete search history.

(56) References Cited

U.S. PATENT DOCUMENTS

| | | | | |
|---|---|---|---|---|
| 2008/0143724 | A1* | 6/2008 | Russakoff | G06T 7/344 |
| | | | | 345/441 |
| 2009/0092301 | A1* | 4/2009 | Jerebko | G06T 7/12 |
| | | | | 382/128 |
| 2010/0322496 | A1* | 12/2010 | Liu | G06T 7/33 |
| | | | | 382/131 |
| 2014/0003719 | A1* | 1/2014 | Bai | G06T 7/269 |
| | | | | 382/173 |
| 2015/0178938 | A1* | 6/2015 | Gorman, III | G06T 7/174 |
| | | | | 382/131 |
| 2015/0363937 | A1* | 12/2015 | Weistrand | G06T 7/30 |
| | | | | 382/131 |
| 2017/0177967 | A1 | 6/2017 | Reda et al. | |
| 2019/0205606 | A1* | 7/2019 | Zhou | G06N 3/045 |
| 2019/0251694 | A1* | 8/2019 | Han | G06N 3/08 |
| 2020/0020107 | A1* | 1/2020 | Kakrania | G06T 7/149 |
| 2020/0342684 | A1* | 10/2020 | Kinsella | G06T 7/344 |

OTHER PUBLICATIONS

Onofrey, et al., Learning intervention-induced deformations for non-rigid MR-CT registration and electrode localization in epilepsy patients. NeuroImage: Clinical, 2016, vol. 10, pp. 291-301.

What is a Cochlear Implant, https://www.fda.gov/medical-devices/cochlear-implants/what-cochlear-implant, last accessed Nov. 17, 2020.

Image-guided Cochlear Implant Programming (IGCIP), https://clinicaltrials.gov/ct2/show/NCT03306082, last accessed Nov. 17, 2020.

Noble, J. H. et al.: Automatic segmentation of intracochlear anatomy in conventional CT. IEEE Transactions on Biomedical Engineering 58(9), 2625-2632 (2011).

Wang, J. et al.: Metal artifact reduction for the segmentation of the intra cochlear anatomy in CT images of the ear with 3D-conditional GANs. Medical Image Analysis 58, 101553 (2019).

Wang, J. et al.: Conditional generative gdversarial networks for metal artifact reduction in CT images of the ear. In: Frangi, A. et al. (eds) Medical Image Computing and Computer Assisted Intervention—MICCAI 2018. Lecture Notes in Computer Science, vol. 11070, pp. 1-3. Springer, Cham (2018).

Mirza, M., Osindero, S.: Conditional generative adversarial nets. arXiv:1411.1784 (2014).

Isola, P. et al.: Image-to-image translation with conditional adversarial networks. In Proceedings of the 2017 IEEE Conference on Computer Vision and Pattern Recognition (CVPR), pp. 1125-1134 (2017).

Pelosi, S. et al.: Analysis of intersubject variations in intracochlear and middle ear surface anatomy for cochlear implantation. Otology & Neurotology 34(9), 1675-1680 (2013).

Christensen, G. E. and Johnson, H. J.: Consistent image registration. IEEE Transactions on Medical Imaging 20(7), 568-582 (2001).

Milletari, F., Navab, N., Ahmadi, S.: V-Net: Fully convolutional neural networks for volumetric medical image segmentation. In: 2016 Fourth International Conference on 3D Vision (3DV), pp. 565-571 (2016).

Hu, Y. et al. Weakly-supervised convolutional neural networks for multimodal image registration. Medical Image Analysis 49, 1-13 (2018).

Kim, B. et al.: Unsupervised deformable image registration using cycle-consistent CNN. In: Shen D. et al. (eds) Medical Image Computing and Computer Assisted Intervention—MICCAI 2019. Lecture Notes in Computer Science, vol. 11769, pp. 166-174. Springer, Cham (2019).

Rueckert, D. et al.: Nonrigid registration using free-form deformations: Application to breast MR images. IEEE Transactions on Medical Imaging 18(8), 712-721 (1999).

Hu, Y. et al.: Label-driven weakly-supervised learning for multimodal deformable image registration, In: 2018 IEEE 15th International Symposium on Biomedical Imaging (ISBI), pp. 1070-1074 (2018).

Ghavami, N. et al.: Automatic slice segmentation of intraoperative transrectal ultrasound images using convolutional neural networks. In: Fei, B., Webster III, R. J. (eds) Proceedings vol. 10576, Medical Imaging 2018: Image-Guided Procedures, Robotic Interventions, and Modeling, 1057603 (2018).

Holm, S.: A simple sequentially rejective multiple test procedure. Scandinavian Journal of Statistics 6(2), 65-70 (1979).

* cited by examiner

Coronal Axial Sagittal

Coronal Axial Sagittal

OBJECTS $Mesh_{atlas}$ $Seg_{atlas}$ $Atlas_{atlas}$ $Mesh_{post}$ $Seg_{post}$ $Pre_{post}$ $PostImg_{posttyp}$

TRAINING

FIG. 2B

METHODS OF AUTOMATIC SEGMENTATION OF ANATOMY IN ARTIFACT AFFECTED CT IMAGES WITH DEEP NEURAL NETWORKS AND APPLICATIONS OF SAME

CROSS-REFERENCE TO RELATED PATENT APPLICATIONS

This application claims priority to and the benefit of U.S. Provisional Patent Application Ser. No. 63/179,655, filed Apr. 26, 2021, which is incorporated herein in its entirety by reference.

This application is also a continuation-in-part application of U.S. patent application Ser. No. 17/266,180, filed Feb. 5, 2021, which is a national stage entry of PCT Patent Application No. PCT/US2019/045221, filed Aug. 6, 2019, which itself claims priority to and the benefit of U.S. Provisional Patent Application Ser. No. 62/714,831, filed Aug. 6, 2018, which are incorporated herein in their entireties by reference.

STATEMENT AS TO RIGHTS UNDER FEDERALLY-SPONSORED RESEARCH

This invention was made with government support under Grant Nos. R01DC014037 and R01DC014462 awarded by the National Institutes of Health (NIH). The government has certain rights in the invention.

FIELD OF THE INVENTION

The invention relates generally to cochlear implants, and more particularly, to atlas-based methods of automatic segmentation of intracochlear anatomy in metal artifact affected CT images of the ear with deep neural networks and applications of the same.

BACKGROUND OF THE INVENTION

The background description provided herein is for the purpose of generally presenting the context of the present invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions. Work of the presently named inventors, to the extent it is described in the background of the invention section, as well as aspects of the description that may not otherwise qualify as prior art at the time of filing, are neither expressly nor impliedly admitted as prior art against the present invention.

The cochlea (FIG. 1C) is a spiral-shaped structure that is part of the inner ear involved in hearing. It contains two main cavities: the scala tympani (ST) and the scala vestibuli (SV). The modiolus (MD) is a porous bone around which the cochlea is wrapped that hosts the auditory nerves. A cochlear implant (CI) is an implanted neuroprosthetic device that is designed to produce hearing sensations in a person with severe to profound deafness by electrically stimulating the auditory nerves. CIs are programmed postoperatively in a process that involves activating all or a subset of the electrodes and adjusting the stimulus level for each of these to a level that is beneficial to the recipient. Programming parameters adjustment is influenced by the intracochlear position of the CI electrodes, which requires the accurate localization of the CI electrodes relative to the intracochlear anatomy (ICA) in the post-implantation CT (Post-CT) images of the CI recipients. This, in turn, requires the accurate segmentation of the ICA in the Post-CT images. Segmenting the ICA in the Post-CT images is challenging due to the strong artifacts produced by the metallic CI electrodes (FIG. 1B) that can obscure these structures, often severely. For patients who have been scanned before implantation, the segmentation of the ICA can be obtained by segmenting their pre-implantation CT (Pre-CT) image (FIG. 1A) using an active shape model-based (ASM) method. The outputs of the ASM method are surface meshes of the ST, the SV, and the MD that have a predefined number of vertices. Importantly, each vertex corresponds to a specific anatomical location on the surface of the structures and the meshes are encoded with the information needed for the programming of the implant. Preserving point-to-point correspondence when registering the images is thus of critical importance in the application. The ICA in the Post-CT image of the patients can be obtained by registering their Pre-CT image to the Post-CT image and then transferring the segmentations of the ICA in the Pre-CT image to the Post-CT image using that transformation. This approach does not extend to CI recipients for whom a Pre-CT image is unavailable, which is the case for long-term recipients who were not scanned before surgery, or for recipients for whom images cannot be retrieved.

Therefore, a heretofore unaddressed need exists in the art to address the aforementioned deficiencies and inadequacies.

SUMMARY OF THE INVENTION

In one aspect, the invention relates to a method for segmentation of structures of interest (SOI) in a computed tomography (CT) image post-operatively acquired from an implant user in a region of interest in which an implant is implanted. The method comprises providing an atlas image, a dataset and networks, wherein the dataset comprises a plurality of CT image pairs, randomly partitioned into a training set, a validation set, and a testing set, wherein each CT image pair has a pre-implantation CT (Pre-CT) image and a post-implantation CT (Post-CT) image respectively acquired in a region of a respective implant recipient before and after an implant is implanted in the region, so that the Pre-CT image and the Post-CT image of each CT image pair are an artifact-free CT image and an artifact-affected CT image, respectively; wherein the atlas image is a Pre-CT image of the region of a subject that is not in the plurality of CT image pairs; and wherein the networks comprises a first network for registering the atlas image to each Post-CT image and a second network for registering each Post-CT image to the atlas image.

The method also comprises training the networks with the plurality of CT image pairs, so as to learn to register the artifact-affected CT images and the atlas image with assistance of the paired artifact-free CT images; inputting the CT image post-operatively acquired from the implant user to the trained networks to generate a dense deformation field (DDF) from the input Post-CT image to the atlas image; and warping a segmentation mesh of the SOI in the atlas image to the input Post-CT image using the DDF so as to generate the segmentation mesh of the SOI in the input Post-CT image, wherein the segmentation mesh of the SOI in the atlas image is generated by applying an active shape model-based (ASM) method to the atlas image.

In one embodiment, said providing the dataset comprises, for each CT image pair, rigidly registering the Pre-CT image to the Post-CT image; and aligning the registered Pre-CT and Post-CT image pair to the atlas image so that anatomical structures in the region of the respective implant recipient are roughly in the same spatial location and orientation.

In one embodiment, said providing the dataset further comprises, for each CT image pair, applying the ASM method to the registered Pre-CT image to generate a segmentation mesh of the SOI in the registered Pre-CT image ($Mesh_{pre}$); transferring the segmentation mesh of the SOI in the registered Pre-CT image ($Mesh_{pre}$) to the Post-CT image, so as to generate a segmentation mesh of the SOI in the Post-CT image ($Mesh_{post}$); and converting the segmentation mesh of the SOI in the Post-CT image ($Mesh_{post}$) to segmentation masks of the SOI in the Post-CT image ($Seg_{post}$).

In one embodiment, all of the images are resampled to an isotropic voxel size, and cropped with images of 3D voxels containing the structures of interest.

In one embodiment, said providing the dataset comprises applying image augmentation to the training set by rotating each image by a plurality of small random angles in the range of −25 and 25 degrees about the x-axis, y-axis, and z-axis, to create additional training images from each original image.

In one embodiment, the networks have network architecture in which $NET_{sSpc-tSpc}$, designed for generating a DDF for warping a source image S to a target image T, comprises a Global-net and a Local-net, wherein the network architecture is configured such that after receiving the concatenation of S and T, the Global-net generates an affine transformation matrix; S is warped to T by using the affine transformation to generate an image S'; the Local-net takes the concatenation of S' and T to generate a non-rigid local DDF; and the affine transformation and the local DDF are composed to produce an output DDF.

In one embodiment, said training the networks comprises inputting a concatenation of the atlas image ($Atlas_{atlas}$) and each Post-CT image ($Post_{post}$) into the networks so that the first network ($NET_{atlas-post}$) generates a DDF from the atlas space to the Post-CT space ($DDF_{atlas-post}$) and the second network ($NET_{post-atlas}$) generates a DDF from the Post-CT space to the atlas space ($DDF_{post-atlas}$); warping the Pre-CT image ($Pre_{sSpc}$), the segmentation masks ($Mask_{sSpc}$), and the fiducial vertices ($FidV_{sSpc}$) in a source space to a target space by using the corresponding DDFs, to generate $Pre_{sSpc-tSpc}$, $Mask_{sSpc-tSpc}$, and $FidV_{sSpc-tSpc}$; and transferring $Pre_{sSpc-tSpc}$, $Mask_{sSpc-tSpc}$, and $FidV_{sSpc-tSpc}$ back to sSpc using the corresponding DDF, to generate $Pre_{sSpc-tSpc-sSpc}$, $Mask_{sSpc-tSpc-sSpc}$, and $FidV_{sSpc-tSpc-sSpc}$, respectively, wherein $O_{xSpc}$ denotes an object O in the x space, sSpc and tSpc respectively denote the source and target spaces.

In one embodiment, $FidV_{atlas}$ and $FidV_{post}$ are the fiducial vertices randomly sampled from $Mesh_{atlas}$ and $Mesh_{post}$ on the fly for calculating the fiducial registration error during training.

In one embodiment, the training objective for $NET_{sSpc-tSpc}$ is constructed using measurements of similarity between a target object in tSpc ($O_{tSpc}$) and a source object that is transferred to tSpc from sSpc ($O_{sSpc-tSpc}$).

In one embodiment, the training objective for the networks is a weighted sum of loss terms of MSPDice, Mean FRE, NCC, CycConsis, BendE, and L2.

$MSPDice=MSPDice(Mask_{post}, Mask_{atlas-post})+MSPDice(Mask_{atlas}, Mask_{post-atlas})$, wherein $MSPDice(Mask_{tSpc}, Mask_{sSpc-tSpc})$ is a multiscale soft probabilistic Dice between $Mask_{tSpc}$ and $Mask_{sSpc-tSpc}$ that measures the similarity of the segmentation masks between $Mask_{tSpc}$ and $Mask_{sSpc-tSpc}$.

Mean $FRE=\overline{FRE}(FidV_{post}, FidV_{atlas-post})+\overline{FRE}(FidV_{atlas}, FidV_{post-atlas})$, wherein $\overline{FRE}(FidV_{tSpc}, FidV_{sSpc-tSpc})$ is a mean fiducial registration error that measures the similarity of the fiducial vertices between $FidV_{tSpc}$ and $FidV_{sSpc-tSpc}$, and is calculated as the average Euclidean distance between the fiducial vertices in $FidV_{tSpc}$ and the corresponding vertices in $FidV_{sSpc-tSpc}$;

$NCC=NCC(Pre_{post}, Atlas_{atlas-post})+NCC(Atlas_{atlas}, Pre_{post-atlas})$, wherein $NCC(Preg_{tSpc}, Pre_{sSpc-tSpc})$ is a normalized cross-correlation between $Pre_{tSpc}$ and $Pre_{sSpc-tSpc}$ that measures the similarity between the warped source image and the target image.

$CycConsis=CycConsis_{atlas-post}+CycConsis_{post-atlas}$, wherein $CycConsis_{sSpc-tSpc}$ is a cycle-consistency loss that measures the similarity between the original source objects in the source space and the source objects that are transferred from the source space to the target space and then transferred back to the source space, wherein $CycConsis_{sSpc-tSpc}=MSPDice(Mask_{sSpc}, Mask_{sSpc-tSpc-sSpc})+2\times\overline{FRE}(FidV_{sSpc}, FidV_{sSpc-tSpc-sSpc})+0.5\times NCC(Pre_{sSpc}, Pre_{sSpc-tSpc-sSpc})$.

$BendE=BendE(DDF_{atlas-post})+BendE(DDF_{post-atlas})$, wherein $BendE(DDF_{sSpc-tSpc})$ is a bending loss for which the DDF from the source space to the target space $DDF_{sSpc-tSpc}$ is regularized using bending energy.

$L2=L2(NET_{atlas-post})+L2(NET_{post-atlas})$, wherein $L2(NET_{sSpc-tSpc})$ is a L2 loss for which the learnable parameters of the registration network $NET_{sSpc-tSpc}$ are regularized by an L2 term.

In one embodiment, the region of interest includes ear, brain, heart, or other organs of a living subject.

In one embodiment, the structures of interest comprise anatomical structures in the region of interest.

In one embodiment, the anatomical structures comprise intra cochlear anatomy (ICA).

In one embodiment, the implant is a cochlear implant, a deep brain stimulator, or a pacemaker.

In another aspect, the invention relates to a method for segmentation of structures of interest (SOI) in a CT image post-operatively acquired with an implant user in a region of interest in which an implant is implanted. The method includes inputting the post-operatively acquired CT (Post-CT) image to trained networks to generate a dense deformation field (DDF) from the input Post-CT image to an atlas image, wherein the atlas image is a Pre-CT image; and warping a segmentation mesh of the SOI in the atlas image to the input Post-CT image using the DDF so as to generate the segmentation mesh of the SOI in the input Post-CT image, wherein the segmentation mesh of the SOI in the atlas image is generated by applying an active shape model-based (ASM) method to the atlas image.

In one embodiment, the networks have network architecture in which $NET_{sSpc-tSpc}$, designed for generating a DDF for warping a source image S to a target image T, comprises a Global-net and a Local-net, wherein the network architecture is configured such that after receiving the concatenation of S and T, the Global-net generates an affine transformation matrix; S is warped to T by using the affine transformation to generate an image S'; the Local-net takes the concatenation of S' and T to generate a non-rigid local DDF; and the affine transformation and the local DDF are composed to produce an output DDF.

In one embodiment, the networks is trained with a dataset comprising a plurality of CT image pairs, randomly partitioned into a training set, a validation set, and a testing set, wherein each CT image pair has a pre-implantation CT (Pre-CT) image and a post-implantation CT (Post-CT) image respectively acquired in a region of a respective implant recipient before and after an implant is implanted in the region, so that the Pre-CT image and the Post-CT image of each CT image pair are an artifact-free CT image and an artifact-affected CT image, respectively.

In one embodiment, the Pre-CT image is rigidly registered to the Post-CT image for each CT image pair; and the registered Pre-CT and Post-CT image pair is aligned to the atlas image so that anatomical structures in the region of the respective implant recipient are roughly in the same spatial location and orientation.

In one embodiment, for each CT image pair, the ASM method is applied to the registered Pre-CT image to generate a segmentation mesh of the SOI in the registered Pre-CT image (Mesh$_{pre}$); the segmentation mesh of the SOI in the registered Pre-CT image (Mesh$_{pre}$) is transferred to the Post-CT image so as to generate a segmentation mesh of the SOI in the Post-CT image (Mesh$_{post}$); and the segmentation mesh of the SOI in the Post-CT image (Mesh$_{post}$) is converted to segmentation masks of the SOI in the Post-CT image (Seg$_{post}$).

In one embodiment, the networks are trained to learn to register the artifact-affected CT images and the atlas image with assistance of the paired artifact-free CT images.

In one embodiment, the networks is trained by inputting a concatenation of the atlas image (Atlas$_{atlas}$) and each Post-CT image (Post$_{post}$) into the networks so that the first network (NET$_{atlas-post}$) generates a DDF from the atlas space to the Post-CT space (DDF$_{atlas-post}$) and the second network (NET post-atlas) generates a DDF from the Post-CT space to the atlas space (DDF$_{post-atlas}$); warping the Pre-CT image (Pre$_{sSpc}$), the segmentation masks (Mask$_{sSpc}$), and the fiducial vertices (FidV$_{sSpc}$) in a source space to a target space by using the corresponding DDFs, to generate Pre$_{sSpc-tSpc}$, Mask$_{sSpc-tSpc}$, and FidV$_{sSpc-tSpc}$; and transferring Pre$_{sSpc-tSpc}$, Mask$_{sSpc-tSpc}$, and FidV$_{sSpc-tSpc}$ back to sSpc using the corresponding DDF, to generate Pre$_{sSpc-tSpc-sSpc}$, Mask$_{sSpc-tSpc-sSpc}$, and FidV$_{sSpc-tSpc-sSpc}$, respectively, wherein O$_{xSpc}$ denotes an object O in the x space, sSpc and tSpc respectively denote the source and target spaces.

In one embodiment, the training objective for NET$_{sSpc-tSpc}$ is constructed using measurements of similarity between a target object in tSpc (O$_{tSpc}$) and a source object that is transferred to tSpc from sSpc (O$_{sSpc-tSpc}$).

In one embodiment, the trained networks are characterized with a training objective that is a weighted sum of loss terms of MSPDice, Mean FRE, NCC, CycConsis, BendE, and L2.

MSPDice=MSPDice(Mask$_{post}$, Mask$_{atlas-post}$)+MSPDice (Mask$_{atlas}$, Mask$_{post-atlas}$), wherein MSPDice(Mask$_{tSpc}$, Mask$_{sSpc-tSpc}$) is a multiscale soft probabilistic Dice between Mask$_{tSpc}$ and Mask$_{sSpc-tSpc}$ that measures the similarity of the segmentation masks between Mask$_{tSpc}$ and Mask$_{sSpc-tSpc}$.

Mean FRE=$\overline{\text{FRE}}$(FidV$_{post}$, FidV$_{atlas-post}$)+$\overline{\text{FRE}}$(FidV$_{atlas}$, FidV$_{post-atlas}$), wherein $\overline{\text{FRE}}$(FidV$_{tSpc}$, FidV$_{sSpc-tSpc}$) is a mean fiducial registration error that measures the similarity of the fiducial vertices between FidV$_{tSpc}$ and FidV$_{sSpc-tSpc}$, and is calculated as the average Euclidean distance between the fiducial vertices in FidV$_{tSpc}$ and the corresponding vertices in FidV$_{sSpc-tSpc}$.

NCC=NCC(Pre$_{post}$, Atlas$_{atlas-post}$)+NCC(Atlas$_{atlas}$, Pre$_{post-atlas}$), wherein NCC(Preg$_{tSpc}$, Pre$_{sSpc-tSpc}$) is a normalized cross-correlation between Pre$_{tSpc}$ and Pre$_{sSpc-tSpc}$ that measures the similarity between the warped source image and the target image.

CycConsis=CycConsis$_{atlas-post}$+CycConsis$_{post-atlas}$, wherein CycConsis$_{sSpc-tSpc}$ is a cycle-consistency loss that measures the similarity between the original source objects in the source space and the source objects that are transferred from the source space to the target space and then transferred back to the source space, wherein CycConsis$_{sSpc-tSpc}$= MSPDice(Mask$_{sSpc}$, Mask$_{sSpc-tSpc-sSpc}$)+2×$\overline{\text{FRE}}$(FidV$_{sSpc}$, FidV$_{sSpc-tSpc-sSpc}$)+0.5×NCC(Pre$_{sSpc}$, Pre$_{sSpc-tSpc-sSpc}$).

BendE=BendE(DDF$_{atlas-post}$)+BendE(DDF$_{post-atlas}$), wherein BendE(DDF$_{sSpc-tSpc}$) is a bending loss for which the DDF from the source space to the target space DDF$_{sSpc-tSpc}$ is regularized using bending energy.

L2=L2(NET$_{atlas-post}$)+L2(NET$_{post-atlas}$), wherein L2(NET$_{sSpc-tSpc}$) is a L2 loss for which the learnable parameters of the registration network NET$_{sSpc-tSpc}$ are regularized by an L2 term.

In yet another aspect, the invention relates to a non-transitory tangible computer-readable medium storing instructions which, when executed by one or more processors, cause a system to perform the above methods.

In a further aspect, the invention relates to a system for segmentation of structures of interest (SOI) in a CT image post-operatively acquired from an implant user in a region of interest in which an implant is implanted. The system includes a trained networks for generating dense deformation fields (DDFs) in opposite directions; and a microcontroller coupled with the trained networks and configured to generate a DDF from the post-operatively acquired CT (Post-CT) image to an atlas image; warp a segmentation mesh of the SOI in the atlas image to the Post-CT image using the DDF to generate a segmentation mesh of the SOI in the Post-CT image, wherein the segmentation mesh of the SOI in the atlas image is generated by applying an active shape model-based (ASM) method to the atlas image, wherein the atlas image is a Pre-CT image.

In one embodiment, the trained networks comprises networks having network architecture in which NET$_{sSpc-tSpc}$, designed for generating a DDF for warping a source image S to a target image T, comprises a Global-net and a Local-net, wherein the network architecture is configured such that after receiving the concatenation of S and T, the Global-net generates an affine transformation matrix; S is warped to T by using the affine transformation to generate an image S'; the Local-net takes the concatenation of S' and T to generate a non-rigid local DDF; and the affine transformation and the local DDF are composed to produce an output DDF.

In one embodiment, the microcontroller is further configured to train the network with a dataset comprising a plurality of CT image pairs, randomly partitioned into a training set, a validation set, and a testing set, wherein each CT image pair has a pre-implantation CT (Pre-CT) image and a post-implantation CT (Post-CT) image respectively acquired in a region of a respective implant recipient before and after an implant is implanted in the region, so that the Pre-CT image and the Post-CT image of each CT image pair are an artifact-free CT image and an artifact-affected CT image, respectively.

In one embodiment, the microcontroller is further configured to apply image augmentation to the training set by rotating each image by a plurality of small random angles in the range of −25 and 25 degrees about the x-axis, y-axis, and z-axis, to create additional training images from each original image.

In one embodiment, the microcontroller is further configured to rigidly register the Pre-CT image to the Post-CT image for each CT image pair; and align the registered Pre-CT and Post-CT image pair to the atlas image so that anatomical structures in the region of the respective implant recipient are roughly in the same spatial location and orientation.

In one embodiment, the microcontroller is further configured to, for each CT image pair, apply the ASM method to the registered Pre-CT image to generate a segmentation mesh of the SOI in the registered Pre-CT image ($Mesh_{pre}$); transfer the segmentation mesh of the SOI in the registered Pre-CT image ($Mesh_{pre}$) to the Post-CT image, so as to generate a segmentation mesh of the SOI in the Post-CT image ($Mesh_{post}$); and convert the segmentation mesh of the SOI in the Post-CT image ($Mesh_{post}$) to segmentation masks of the SOI in the Post-CT image ($Seg_{post}$).

In one embodiment, the networks are trained to learn to register the artifact-affected CT images and the atlas image with assistance of the paired artifact-free CT images.

In one embodiment, the networks is trained by inputting a concatenation of the atlas image ($Atlas_{atlas}$) and each Post-CT image ($Post_{post}$) into the networks so that the first network ($NET_{atlas-post}$) generates a DDF from the atlas space to the Post-CT space (DD F atlas-post) and the second network ($NET_{post-atlas}$) generates a DDF from the Post-CT space to the atlas space ($DDF_{post-atlas}$); warping the Pre-CT image ($Pre_{sSpc}$), the segmentation masks ($Mask_{sSpc}$), and the fiducial vertices ($FidV_{sSpc}$) in a source space to a target space by using the corresponding DDFs, to generate $Pre_{sSpc-tSpc}$, $Mask_{sSpc-tSpc}$, and $FidV_{sSpc-tSpc}$, and transferring $Pre_{sSpc-tSpc}$, $Mask_{sSpc-tSpc}$, and $FidV_{sSpc-tSpc}$ back to sSpc using the corresponding DDF, to generate $Pre_{sSpc-tSpc-sSpc}$, $Mask_{sSpc-tSpc-sSpc}$, and $FidV_{sSpc-tSpc-sSpc}$, respectively, wherein $O_{x,Spc}$ denotes an object O in the x space, sSpc and tSpc respectively denote the source and target spaces.

In one embodiment, the training objective for $NET_{sSpc-tSpc}$ is constructed using measurements of similarity between a target object in tSpc ($O_{tSpc}$) and a source object that is transferred to tSpc from sSpc ($O_{sSpc-tSpc}$).

In one embodiment, the trained networks are characterized with a training objective that is a weighted sum of loss terms of MSPDice, Mean FRE, NCC, CycConsis, BendE, and L2.

$MSPDice=MSPDice(Mask_{post}, Mask_{atlas-post})+MSPDice(Mask_{atlas}, Mask_{post-atlas})$, wherein $MSPDice(Mask_{tSpc}, Mask_{sSpc-tSpc})$ is a multiscale soft probabilistic Dice between $Mask_{tSpc}$ and $Mask_{sSpc-tSpc}$ that measures the similarity of the segmentation masks between $Mask_{tSpc}$ and $Mask_{sSpc-tSpc}$.

Mean $\overline{FRE}=\overline{FRE}(FidV_{post}, FidV_{atlas-post})+\overline{FRE}(FidV_{atlas}, FidV_{post-atlas})$, wherein $\overline{FRE}(FidV_{tSpc}, FidV_{sSpc-tSpc})$ is a mean fiducial registration error that measures the similarity of the fiducial vertices between $FidV_{tSpc}$ and $FidV_{sSpc-tSpc}$, and is calculated as the average Euclidean distance between the fiducial vertices in $FidV_{tSpc}$ and the corresponding vertices in $FidV_{sSpc-tSpc}$.

$NCC=NCC(Pre_{post}, Atlas_{atlas-post})+NCC(Atlas_{atlas}, Pre_{post-atlas})$, wherein $NCC(Preg_{tSpc}, Pre_{sSpc-tSpc})$ is a normalized cross-correlation between $Pre_{tSpc}$ and $Pre_{sSpc-tSpc}$ that measures the similarity between the warped source image and the target image.

$CycConsis=CycConsis_{atlas-post}+CycConsis_{post-atlas}$, wherein $CycConsis_{sSpc-tSpc}$ is a cycle-consistency loss that measures the similarity between the original source objects in the source space and the source objects that are transferred from the source space to the target space and then transferred back to the source space, wherein $CycConsis_{sSpc-tSpc}=MSPDice(Mask_{sSpc}, Mask_{sSpc-tSpc-sSpc})+2×\overline{FRE}(FidV_{sSpc}, FidV_{sSpc-tSpc-sSpc})+0.5×NCC(Pre_{sSpc}, Pre_{sSpc-tSpc-sSpc})$.

$BendE=BendE(DDF_{atlas-post})+BendE(DDF_{post-atlas})$, wherein $BendE(DDF_{sSpc-tSpc})$ is a bending loss for which the DDF from the source space to the target space $DDF_{sSpc-tSpc}$ is regularized using bending energy.

$L2=L2(NET_{atlas-post})+L2(NET_{post-atlas})$, wherein $L2(NET_{sSpc-tSpc})$ is a L2 loss for which the learnable parameters of the registration network $NET_{sSpc-tSpc}$ are regularized by an L2 term.

In one embodiment, the region of interest includes ear, brain, heart, or other organs of a living subject.

In one embodiment, the structures of interest comprise anatomical structures in region of interest.

In one embodiment, the anatomical structures comprise intra cochlear anatomy (ICA).

In one embodiment, the implant is a cochlear implant, a deep brain stimulator, or a pacemaker.

These and other aspects of the present invention will become apparent from the following description of the preferred embodiments, taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. The same reference numbers may be used throughout the drawings to refer to the same or like elements in the embodiments.

Figure 2B:
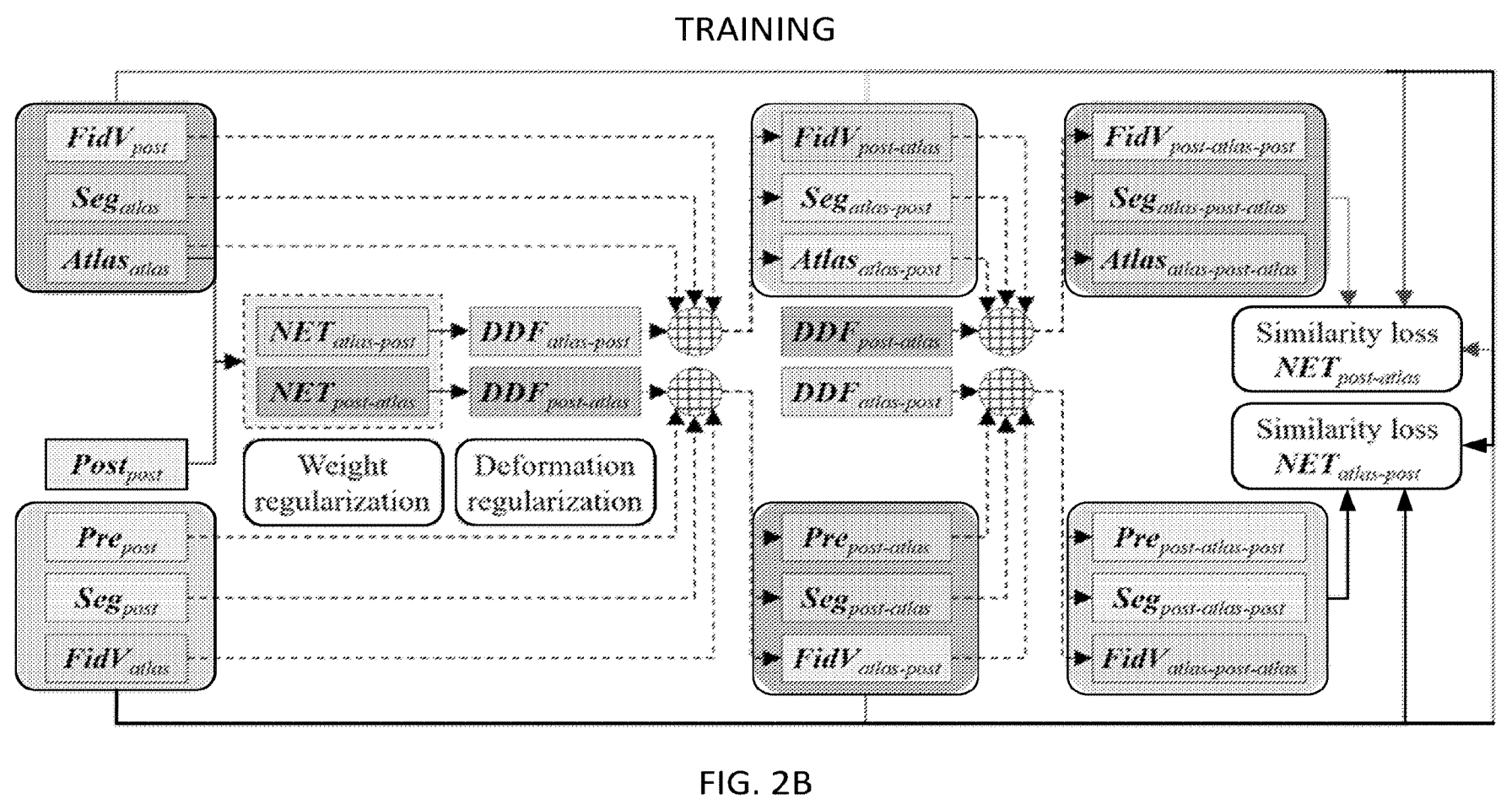

FIGS. 2A-2C show schematically the framework of the method according to embodiments of the invention. FIG. 2A: Objects used for training the networks. FIG. 2B: Training phase. FIG. 2C: Inference phase.

FIG. 3 is an illustration of a registration network $NET_{sSpc-tSpc}$ that is tasked to generate a DDF from the source space to the target space according to embodiments of the invention.

DETAILED DESCRIPTION OF THE INVENTION

Figure 1A:
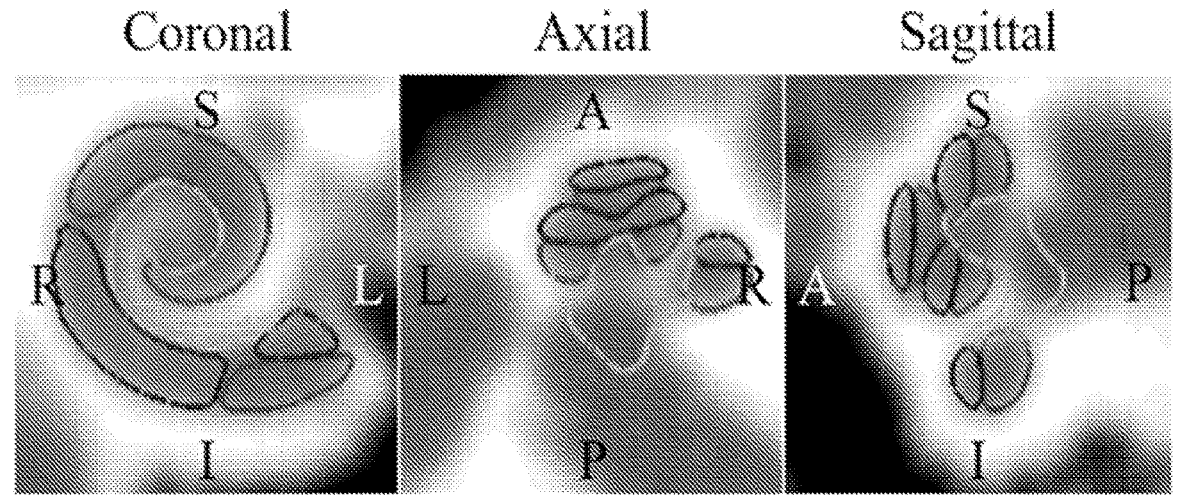
FIGS. 1A-1B show schematically a pair of registered Pre-CT and Post-CT images, respectively, of an ear of a CI recipient.
Figure 1B:
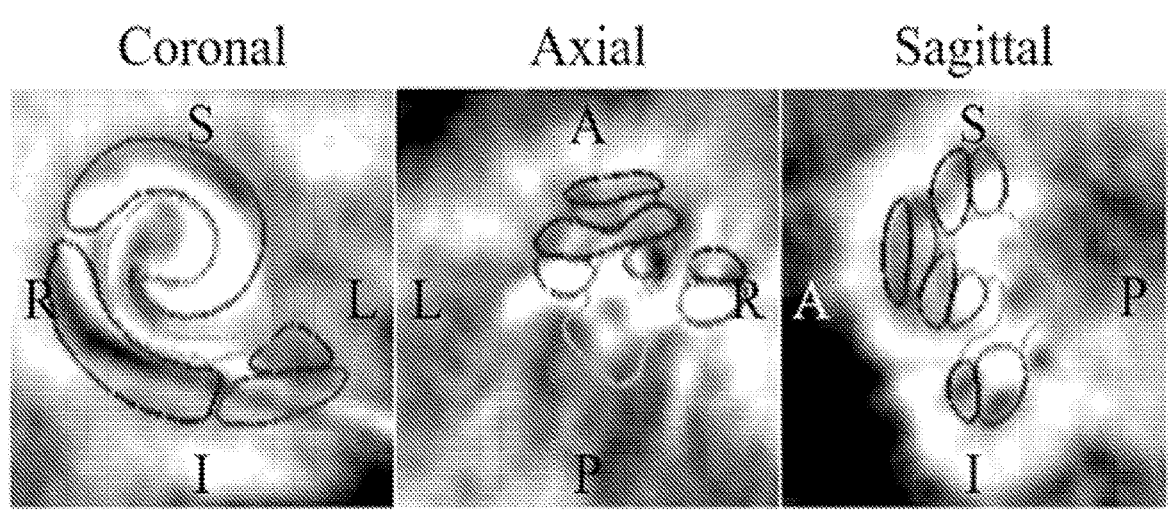
Figure 1C:
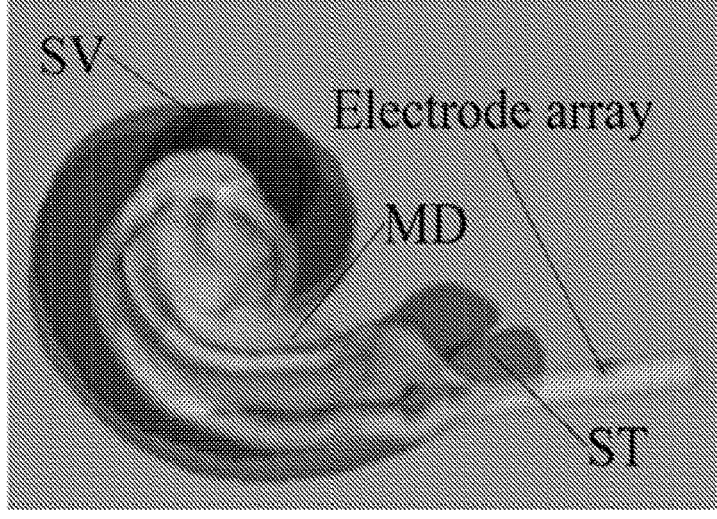
FIG. 1C is an illustration of the intracochlear anatomy with an implanted CI electrode array. The meshes of the ST, the SV, and the MD are obtained by applying the ASM method to the Pre-CT image

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this invention will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that, as used in the description herein and throughout the claims that follow, the meaning of "a", "an", and "the" includes plural reference unless the context clearly dictates otherwise. Also, it will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Furthermore, relative terms, such as "lower" or "bottom" and "upper" or "top," may be used herein to describe one element's relationship to another element as illustrated in the figures. It will be understood that relative terms are intended to encompass different orientations of the device in addition to the orientation depicted in the figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures. is turned over, elements described as "below" or "beneath" other elements would then be oriented "above" the other elements. The exemplary terms "below" or "beneath" can, therefore, encompass both an orientation of above and below.

It will be further understood that the terms "comprises" and/or "comprising." or "includes" and/or "including" or "has" and/or "having", or "carry" and/or "carrying," or "contain" and/or "containing," or "involve" and/or "involving, and the like are to be open-ended, i.e., to mean including but not limited to. When used in this invention, they specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present invention, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprise" or "comprising", "include" or "including", "carry" or "carrying", "has/have" or "having", "contain" or "containing", "involve" or "involving" and the like are to be understood to be open-ended, i.e., to mean including but not limited to.

As used herein, the phrase "at least one of A, B, and C" should be construed to mean a logical (A or B or C), using a non-exclusive logical OR. It should be understood that one or more steps within a method may be executed in different order (or concurrently) without altering the principles of the invention.

The description below is merely illustrative in nature and is in no way intended to limit the invention, its application, or uses. The broad teachings of the invention can be implemented in a variety of forms. Therefore, while this invention includes particular examples, the true scope of the invention should not be so limited since other modifications will become apparent upon a study of the drawings, the specification, and the following claims. For purposes of clarity, the same reference numbers will be used in the drawings to identify similar elements. It should be understood that one or more steps within a method may be executed in different order (or concurrently) without altering the principles of the invention.

In view of the aforementioned deficiencies and inadequacies, a two-step method, which is referred to as "cGANs+ ASM", is disclosed in U.S. patent application Ser. No. 17/266,180, which is incorporated herein in its entirety by reference. The method first uses conditional generative adversarial networks (cGANs) to synthesize artifact-free Pre-CT images from the Post-CT images and then uses the ASM method to segment the ICA in the synthetic images. To the best of inventors' knowledge, the cGANs+ASM is the most accurate automatic method for ICA segmentation in Post-CT images.

One of the objectives of this invention is to provide an atlas-based method to segment the intracochlear anatomy (ICA) in the post-implantation CT (Post-CT) images of cochlear implant (CI) recipients that preserves the point-to-point correspondence between the meshes in the atlas and the segmented volumes. To solve this problem, which is challenging because of the strong artifacts produced by the implant, a pair of co-trained deep networks that generate dense deformation fields (DDFs) in opposite directions is used. One network is tasked with registering an atlas image to the Post-CT images and the other network is tasked with registering the Post-CT im-ages to the atlas image. The networks are trained using loss functions based on voxel-wise labels, image content, fiducial registration error, and cycle-consistency constraint. The segmentation of the ICA in the Post-CT images is subsequently obtained by transferring the predefined segmentation meshes of the ICA in the atlas image to the Post-CT images using the corresponding DDFs generated by the trained registration networks. The model can learn the underlying geometric features of the ICA even though they are obscured by the metal artifacts. It is shown that the end-to-end network produces results that are comparable to the current state of the art (SOTA) that relies on the two-step method that first uses conditional generative adversarial networks to synthesize artifact-free images from the Post-CT images and then uses an active shape model-based method to segment the ICA in the synthetic images, as disclosed in U.S. patent application Ser. No. 17/266,180, which is incorporated herein in its entirety by reference. Among other things, the atlas-based method operably produces results in a fraction of the time needed by the SOTA and is more robust to noise and poor image quality and faster, which is important for end-user acceptance.

In one aspect, the invention relates to a method for segmentation of structures of interest (SOI) in a CT image post-operatively acquired from an implant user in a region of interest in which an implant is implanted. In some embodiments, the region of interest includes ear, brain, heart, or other organs of a living subject, the structures of interest comprise anatomical structures in the region of interest, and the anatomical structures comprise the ICA. In some embodiments, the implant is a cochlear implant, a deep brain stimulator, or a pacemaker.

In some embodiments, the method comprises providing an atlas image, a dataset and networks.

The dataset comprises a plurality of CT image pairs, randomly partitioned into a training set, a validation set, and a testing set, wherein each CT image pair has a pre-implantation CT (Pre-CT) image and a post-implantation CT (Post-CT) image respectively acquired in a region of a respective implant recipient before and after an implant is implanted in the region, so that the Pre-CT image and the Post-CT image of each CT image pair are an artifact-free CT image and an artifact-affected CT image, respectively.

In some embodiments, the Pre-CT image is rigidly registered to the Post-CT image for each CT image pair; and the registered Pre-CT and Post-CT image pair is aligned to the atlas image so that anatomical structures in the region of the respective implant recipient are roughly in the same spatial location and orientation.

In some embodiments, for each CT image pair, the ASM method is applied to the registered Pre-CT image to generate a segmentation mesh of the SOI in the registered Pre-CT image ($\text{Mesh}_{pre}$); the segmentation mesh of the SOI in the registered Pre-CT image ($\text{Mesh}_{pre}$) is transferred to the Post-CT image so as to generate a segmentation mesh of the SOI in the Post-CT image ($\text{Mesh}_{post}$); and the segmentation mesh of the SOI in the Post-CT image ($\text{Mesh}_{post}$) is converted to segmentation masks of the SOI in the Post-CT image ($\text{Seg}_{post}$).

In some embodiments, the atlas image is a Pre-CT image of the region of a subject that is not in the plurality of CT image pairs.

In some embodiments, all of the images are resampled to an isotropic voxel size, and cropped with images of 3D voxels containing the structures of interest.

In some embodiments, image augmentation is applied to the training set by rotating each image by a plurality of small random angles in the range of −25 and 25 degrees about the x-axis, y-axis, and z-axis, to create additional training images from each original image.

Figure 2A:
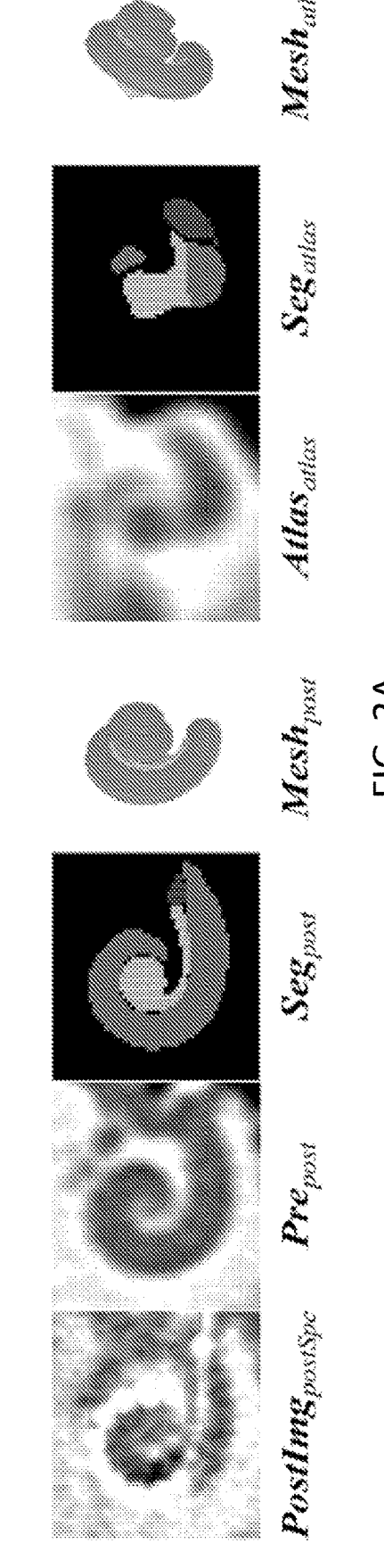
Figures 2C, 3:
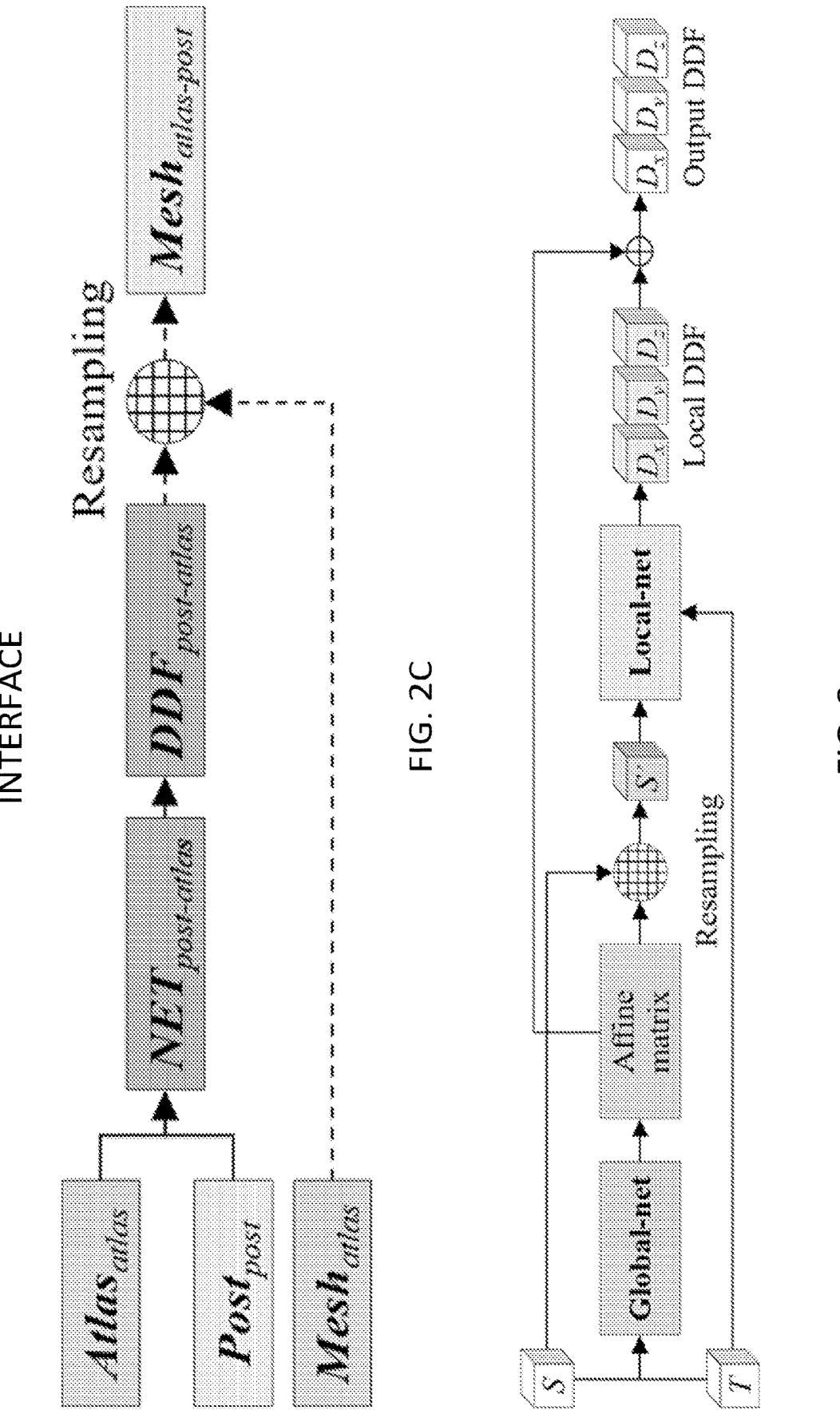

In some embodiments, as shown in FIG. 3, the networks have network architecture in which $\text{NET}_{sSpc-tSpc}$, designed for generating a DDF for warping a source image S to a target image T, comprises a Global-net and a Local-net, wherein the network architecture is configured such that after receiving the concatenation of S and T, the Global-net generates an affine transformation matrix; S is warped to T by using the affine transformation to generate an image S'; the Local-net takes the concatenation of S' and T to generate a non-rigid local DDF; and the affine transformation and the local DDF are composed to produce an output DDF.

In some embodiments, the networks comprises a first network for registering the atlas image to each Post-CT image and a second network for registering each Post-CT image to the atlas image.

The method also comprises training the networks with the plurality of CT image pairs, so as to learn to register the artifact-affected CT images and the atlas image with assistance of the paired artifact-free CT images; inputting the CT image post-operatively acquired from the implant user to the trained networks to generate a DDF from the input Post-CT image to the atlas image; and warping a segmentation mesh of the SOI in the atlas image to the input Post-CT image using the DDF so as to generate the segmentation mesh of the SOI in the input Post-CT image, wherein the segmentation mesh of the SOI in the atlas image is generated by applying an active shape model-based (ASM) method to the atlas image.

In some embodiments, as shown in FIG. 2B, said training the networks comprises inputting a concatenation of the atlas image ($\text{Atlas}_{atlas}$) and each Post-CT image ($\text{Post}_{post}$) into the networks so that the first network ($\text{NET}_{atlas-post}$) generates a DDF from the atlas space to the Post-CT space ($\text{DDF}_{atlas-post}$) and the second network (NET post-atlas) generates a DDF from the Post-CT space to the atlas space ($\text{DDF}_{post-atlas}$); warping the Pre-CT image ($\text{Pre}_{sSpc}$), the segmentation masks ($\text{Mask}_{sSpc}$), and the fiducial vertices ($\text{FidV}_{sSpc}$) in a source space to a target space by using the corresponding DDFs, to generate $\text{Pre}_{sSpc-tSpc}$, $\text{Mask}_{sSpc-tSpc}$, and $\text{FidV}_{sSpc-tSpc}$; and transferring $\text{Pre}_{sSpc-tSpc}$, $\text{Mask}_{sSpc-tSpc}$, and $\text{FidV}_{sSpc-tSpc}$ back to sSpc using the corresponding DDF, to generate $\text{Pre}_{sSpc-tSpc-sSpc}$, $\text{Mask}_{sSpc-tSpc-sSpc}$, and $\text{FidV}_{sSpc-tSpc-sSpc}$, respectively, wherein $O_{xSpc}$ denotes an object O in the x space, sSpc and tSpc respectively denote the source and target spaces.

In some embodiments, $\text{FidV}_{atlas}$ and $\text{FidV}_{post}$ are the fiducial vertices randomly sampled from $\text{Mesh}_{atlas}$ and $\text{Mesh}_{post}$ on the fly for calculating the fiducial registration error during training.

In some embodiments, the training objective for $\text{NET}_{sSpc-tSpc}$ is constructed using measurements of similarity between a target object in tSpc ($O_{tSpc}$) and a source object that is transferred to tSpc from sSpc ($O_{sSpc-tSpc}$).

In some embodiments, the training objective for the networks is a weighted sum of loss terms of MSPDice, Mean FRE, NCC, CycConsis, BendE, and L2.

$\text{MSPDice}=\text{MSPDice}(\text{Mask}_{post}, \text{Mask}_{atlas-post})+\text{MSPDice}(\text{Mask}_{atlas}, \text{Mask}_{post-atlas})$, wherein $\text{MSPDice}(\text{Mask}_{tSpc}, \text{Mask}_{sSpc-tSpc})$ is a multiscale soft probabilistic Dice between $\text{Mask}_{tSpc}$ and $\text{Mask}_{sSpc-tSpc}$ that measures the similarity of the segmentation masks between $\text{Mask}_{tSpc}$ and $\text{Mask}_{sSpc-tSpc}$.

Mean $\text{FRE}=\text{FRE}(\text{FidV}_{post}, \text{FidV}_{atlas-post})+\text{FRE}(\text{FidV}_{atlas}, \text{FidV}_{post-atlas})$, wherein $\text{FRE}(\text{FidV}_{tSpc}, \text{FidV}_{sSpc-tSpc})$ is a mean fiducial registration error that measures the similarity of the fiducial vertices between $\text{FidV}_{tSpc}$ and $\text{FidV}_{sSpc-tSpc}$, and is calculated as the average Euclidean distance between the fiducial vertices in $\text{FidV}_{tSpc}$ and the corresponding vertices in $\text{FidV}_{sSpc-tSpc}$.

$\text{NCC}=\text{NCC}(\text{Pre}_{post}, \text{Atlas}_{atlas-post})+\text{NCC}(\text{Atlas}_{atlas}, \text{Pre}_{post-atlas})$, wherein $\text{NCC}(\text{Preg}_{tSpc}, \text{Pre}_{sSpc-tSpc})$ is a normalized cross-correlation between $\text{Pre}_{tSpc}$ and $\text{Pre}_{sSpc-tSpc}$ that measures the similarity between the warped source image and the target image.

$\text{CycConsis}=\text{CycConsis}_{atlas-post}+\text{CycConsis}_{post-atlas}$, wherein $\text{CycConsis}_{sSpc-tSpc}$ is a cycle-consistency loss that measures the similarity between the original source objects in the source space and the source objects that are transferred from the source space to the target space and then transferred back to the source space, wherein $\text{CycConsis}_{sSpc-tSpc}=\text{MSPDice}(\text{Mask}_{sSpc}, \text{Mask}_{sSpc-tSpc-sSpc})+2\times\text{FRE}(\text{FidV}_{sSpc}, \text{FidV}_{sSpc-tSpc-sSpc})+0.5\times\text{NCC}(\text{Pre}_{sSpc}, \text{Pre}_{sSpc-tSpc-sSpc})$.

$\text{BendE}=\text{BendE}(\text{DDF}_{atlas-post})+\text{BendE}(\text{DDF}_{post-atlas})$, wherein $\text{BendE}(\text{DDF}_{sSpc-tSpc})$ is a bending loss for which the DDF from the source space to the target space $\text{DDF}_{sSpc-tSpc}$ is regularized using bending energy.

$\text{L2}=\text{L2}(\text{NET}_{atlas-post})+\text{L2}(\text{NET}_{post-atlas})$, wherein $\text{L2}(\text{NET}_{sSpc-tSpc})$ is a L2 loss for which the learnable parameters of the registration network $\text{NET}_{sSpc-tSpc}$ are regularized by an L2 term.

In another aspect, the invention relates to a system for segmentation of SOI in a CT image post-operatively acquired from an implant user in a region of interest in which an implant is implanted.

The system includes a trained networks for generating DDFs in opposite directions; and a microcontroller coupled with the trained networks and configured to generate a DDF from the post-operatively acquired CT (Post-CT) image to an atlas image; warp a segmentation mesh of the SOI in the atlas image to the Post-CT image using the DDF to generate a segmentation mesh of the SOI in the Post-CT image, wherein the segmentation mesh of the SOI in the atlas image is generated by applying an ASM method to the atlas image. The atlas image is a Pre-CT image.

In some embodiments, the trained networks comprises networks having network architecture in which $\text{NET}_{sSpc-tSpc}$, designed for generating a DDF for warping a source image S to a target image T, comprises a Global-net and a Local-net, wherein the network architecture is configured such that after receiving the concatenation of S and T, the Global-net generates an affine transformation matrix; S is warped to T by using the affine transformation to generate an image S'; the Local-net takes the concatenation of S' and T to generate a non-rigid local DDF; and the affine transformation and the local DDF are composed to produce an output DDF.

In some embodiments, the microcontroller is further configured to train the network with a dataset comprising a plurality of CT image pairs, randomly partitioned into a training set, a validation set, and a testing set, wherein each CT image pair has a pre-implantation CT (Pre-CT) image and a post-implantation CT (Post-CT) image respectively acquired in a region of a respective implant recipient before and after an implant is implanted in the region, so that the Pre-CT image and the Post-CT image of each CT image pair are an artifact-free CT image and an artifact-affected CT image, respectively.

In some embodiments, the microcontroller is further configured to apply image augmentation to the training set by rotating each image by a plurality of small random angles in the range of $-25$ and $25$ degrees about the x-axis, y-axis, and z-axis, to create additional training images from each original image.

In some embodiments, the microcontroller is further configured to rigidly register the Pre-CT image to the Post-CT image for each CT image pair; and align the registered Pre-CT and Post-CT image pair to the atlas image so that anatomical structures in the region of the respective implant recipient are roughly in the same spatial location and orientation.

In some embodiments, the microcontroller is further configured to, for each CT image pair, apply the ASM method to the registered Pre-CT image to generate a segmentation mesh of the SOI in the registered Pre-CT image ($\text{Mesh}_{pre}$); transfer the segmentation mesh of the SOI in the registered Pre-CT image ($\text{Mesh}_{pre}$) to the Post-CT image, so as to generate a segmentation mesh of the SOI in the Post-CT image ($\text{Mesh}_{post}$); and convert the segmentation mesh of the SOI in the Post-CT image ($\text{Mesh}_{post}$) to segmentation masks of the SOI in the Post-CT image ($\text{Seg}_{post}$).

In some embodiments, the networks are trained to learn to register the artifact-affected CT images and the atlas image with assistance of the paired artifact-free CT images.

In some embodiments, the networks is trained by inputting a concatenation of the atlas image ($\text{Atlas}_{atlas}$) and each Post-CT image ($\text{Post}_{post}$) into the networks so that the first network ($\text{NET}_{atlas-post}$) generates a DDF from the atlas space to the Post-CT space ($\text{DDF}_{atlas-post}$) and the second network ($\text{NET}_{post-atlas}$) generates a DDF from the Post-CT space to the atlas space ($\text{DDF}_{post-atlas}$); warping the Pre-CT image ($\text{Pre}_{sSpc}$), the segmentation masks ($\text{Mask}_{sSpc}$), and the fiducial vertices ($\text{FidV}_{sSpc}$) in a source space to a target space by using the corresponding DDFs, to generate $\text{Pre}_{sSpc-tSpc}$, $\text{Mask}_{sSpc-tSpc}$, and $\text{FidV}_{sSpc-tSpc}$; and transferring $\text{Pre}_{sSpc-tSpc}$, $\text{Mask}_{sSpc-tSpc}$, and $\text{FidV}_{sSpc-tSpc}$ back to sSpc using the corresponding DDF, to generate $\text{Pre}_{sSpc-tSpc-sSpc}$, $\text{Mask}_{sSpc-tSpc-sSpc}$, and $\text{FidV}_{sSpc-tSpc-sSpc}$, respectively, wherein $O_{xSpc}$ denotes an object O in the x space, sSpc and tSpc respectively denote the source and target spaces.

In some embodiments, the training objective for $\text{NET}_{sSpc-tSpc}$ is constructed using measurements of similarity between a target object in tSpc ($O_{tSpc}$) and a source object that is transferred to tSpc from sSpc ($O_{sSpc-tSpc}$).

In some embodiments, the trained networks are characterized with a training objective that is a weighted sum of loss terms of MSPDice, Mean FRE, NCC, CycConsis, BendE, and L2.

MSPDice=MSPDice($\text{Mask}_{post}$, $\text{Mask}_{atlas\text{-}post}$)+MSPDice ($\text{Mask}_{atlas}$, $\text{Mask}_{post\text{-}atlas}$), wherein MSPDice($\text{Mask}_{tSpc}$, $\text{Mask}_{sSpc\text{-}tSpc}$) is a multiscale soft probabilistic Dice between $\text{Mask}_{tSpc}$ and $\text{Mask}_{sSpc\text{-}tSpc}$ that measures the similarity of the segmentation masks between $\text{Mask}_{tSpc}$ and $\text{Mask}_{sSpc\text{-}tSpc}$.

Mean FRE=FRE($\text{FidV}_{post}$, $\text{FidV}_{atlas\text{-}post}$)+FRE($\text{FidV}_{atlas}$, $\text{FidV}_{post\text{-}atlas}$), wherein FRE($\text{FidV}_{tSpc}$, $\text{FidV}_{sSpc\text{-}tSpc}$) is a mean fiducial registration error that measures the similarity of the fiducial vertices between $\text{FidV}_{tSpc}$ and $\text{FidV}_{sSpc\text{-}tSpc}$ and is calculated as the average Euclidean distance between the fiducial vertices in $\text{FidV}_{tSpc}$ and the corresponding vertices in $\text{FidV}_{sSpc\text{-}tSpc}$.

NCC=NCC($\text{Pre}_{post}$, $\text{Atlas}_{atlas\text{-}post}$)+NCC($\text{Atlas}_{atlas}$, $\text{Pre}_{post\text{-}atlas}$), wherein NCC($\text{Preg}_{tSpc}$, $\text{Pre}_{sSpc\text{-}tSpc}$) is a normalized cross-correlation between $\text{Pre}_{tSpc}$ and $\text{Pre}_{sSpc\text{-}tSpc}$ that measures the similarity between the warped source image and the target image.

CycConsis=$\text{CycConsis}_{atlas\text{-}post}$+$\text{CycConsis}_{post\text{-}atlas}$, wherein $\text{CycConsis}_{sSpc\text{-}tSpc}$ is a cycle-consistency loss that measures the similarity between the original source objects in the source space and the source objects that are transferred from the source space to the target space and then transferred back to the source space, wherein $\text{CycConsis}_{sSpc\text{-}tSpc}$=MSPDice($\text{Mask}_{sSpc}$, $\text{Mask}_{sSpc\text{-}tSpc\text{-}sSpc}$)+2×FRE($\text{FidV}_{sSpc}$, $\text{FidV}_{sSpc\text{-}tSpc\text{-}sSpc}$)+0.5×NCC($\text{Pre}_{sSpc}$, $\text{Pre}_{sSpc\text{-}tSpc}$sSpc).

BendE=BendE($\text{DDF}_{atlas\text{-}post}$)+BendE($\text{DDF}_{post\text{-}atlas}$), wherein BendE($\text{DDF}_{sSpc\text{-}tSpc}$) is a bending loss for which the DDF from the source space to the target space $\text{DDF}_{sSpc\text{-}tSpc}$ is regularized using bending energy.

L2=L2($\text{NET}_{atlas\text{-}post}$)+L2($\text{NET}_{post\text{-}atlas}$), wherein L2($\text{NET}_{sSpc\text{-}tSpc}$) is a L2 loss for which the learnable parameters of the registration network $\text{NET}_{sSpc\text{-}tSpc}$ are regularized by an L2 term.

Segmentation of the ICA is important to assist audiologists in programming cochlear implant. Segmenting the anatomy in images acquired after implantation is difficult because the implant produces very strong artifacts. The method system disclosed herein permit the segmentation of these images despite these artifacts. It is also robust to poor image quality, i.e., images affected by noise or blurred.

It should be noted that all or a part of the steps according to the embodiments of the present invention is implemented by hardware or a program instructing relevant hardware. Yet another aspect of the invention provides a non-transitory computer readable storage medium/memory which stores computer executable instructions or program codes. The computer executable instructions or program codes enable a system to complete various operations in the above disclosed method for segmentation of structures of interest (e.g., ICA) in a CT image post-operatively acquired with an implant user in a region of interest in which an implant is implanted. The storage medium/memory may include, but is not limited to, high-speed random access medium/memory such as DRAM, SRAM, DDR RAM or other random access solid state memory devices, and non-volatile memory such as one or more magnetic disk storage devices, optical disk storage devices, flash memory devices, or other non-volatile solid state storage devices.

Without intent to limit the scope of the invention, examples and their related results according to the embodiments of the present invention are given below. Note that titles or subtitles may be used in the examples for convenience of a reader, which in no way should limit the scope of the invention. Moreover, certain theories are proposed and disclosed herein; however, in no way they, whether they are right or wrong, should limit the scope of the invention so long as the invention is practiced according to the invention without regard for any particular theory or scheme of action.

Example

Atlas-Based Segmentation of Intracochlear Anatomy in Metal Artifact Affected Ct Images of the Ear with Co-Trained Deep Neural Networks In this exemplary example, an end-to-end atlas-based method is developed, which first generates a dense deformation field (DDF) between an artifact-free atlas image and a Post-CT image. The segmentation of the intracochlear anatomy (ICA) in the Post-CT image can then be obtained by transferring the predefined segmentation meshes of the ICA in the atlas image to the Post-CT image using that the DDF. Practically, the inter-subject non-rigid registration between the atlas image and the Post-CT image is a difficult task because (1) considerable variation in cochlear anatomy across individuals has been documented, and (2) the artifacts in the Post-CT image change, often severely, the appearance of the anatomy, which has a significant influence on the accuracy of registration methods guided by intensity-based similarity metrics. To overcome the challenges, the exemplary study herein discloses a method to perform registrations between an atlas image and the Post-CT images that rely on deep networks. Following the idea of consistent image registration obtained by jointly estimating the forward and reverse transformations between two images proposed by Christensen et al., a pair of co-trained networks that generate DDFs in opposite directions is adapted. One network is tasked with registering the atlas image to the Post-CT image and the other one is tasked with registering the Post-CT image to the atlas image. The networks are trained using loss functions that include voxel-wise labels, image content, fiducial registration error (FRE), and cycle-consistency constraint. The model can segment the ICA and preserve point-to-point correspondence between the atlas and the Post-CT meshes, even when the ICA is difficult to localize visually.

Method

Data: the dataset includes Pre-CT and Post-CT image pairs of 624 ears. The atlas image is a Pre-CT image of an ear that is not in the 624 ears. The Pre-CT images are acquired with several conventional scanners (GE Bright-Speed, LightSpeed Ultra; Siemens Sensation 16; and Philips M×8000 IDT, iCT 128, and Brilliance 64) and the Post-CT images are acquired with a low-dose flat-panel volumetric scanner (Xoran Technologies xCAT® ENT). The typical voxel size is $0.25\times0.25\times0.3$ mm$^3$ for the Pre-CT images and $0.4\times0.4\times0.4$ mm$^3$ for the Post-CT images. For each ear, the Pre-CT image is rigidly registered to the Post-CT image. The registration is accurate because the surgery, which comprises threading an electrode array through a small hole into the bony cavity, does not induce non-rigid deformation of the cochlea. The registered Pre-CT and Post-CT image pairs are then aligned to the atlas image so that the ears are roughly in the same spatial location and orientation. All of the images are resampled to an isotropic voxel size of 0.2 mm. Images of 64×64×64 voxels that contain the cochleae are cropped from the full-sized images, and the networks are trained to process such cropped images.

Learning to Register the Artifact-affected Images and the Atlas Image with Assistance of the Paired Artifact-free Images: FIG. 2A shows a list of images, meshes, and masks used to train the networks. For simplicity, $O_{xSpc}$ or $O_x$ is used to denote an object O in the x space. For example, AtlasIm- $g_{atlas}$ or $Atlas_{atlas}$ is the atlas image in the atlas space. Similarly, $PostImg_{post}$ or $Post_{post}$ is a Post-CT image in the Post-CT space. $Mesh_{atlas}$ is the segmentation mesh of the ICA in $Atlas_{atlas}$ generated by applying the active shape model-based (ASM) method to $Atlas_{atlas}$. $PreImg_{post}$ or $Pre_{post}$ is the paired Pre-CT image of $Post_{post}$ registered to the original Post-CT image. $Mesh_{post}$ is the segmentation mesh of the ICA in $Post_{post}$, which is generated by applying the ASM method to $Pre_{post}$ and then transferring the meshes to $Post_{post}$. $Mask_{atlas}$ ($Seg_{atlas}$) and $Mask_{post}$ ($Seg_{post}$) are segmentation masks of the ST, SV, and MD. They are generated by converting $Mesh_{atlas}$ and $Mesh_{post}$ to masks.

As shown in FIG. 2B, the input of the networks is the concatenation of $Atlas_{atlas}$ and $Post_{post}$. The networks include a first network ($NET_{atlas-post}$) that generates a DDF from the atlas space to the Post-CT space ($DDF_{atlas-post}$) and a second network ($NET_{post-atlas}$) that generates a DDF from the Post-CT space to the atlas space ($DDF_{post-atlas}$). $FidV_{atlas}$ and $FidV_{post}$ are fiducial vertices randomly sampled from $Mesh_{atlas}$ and $Mesh_{post}$ on the fly for calculating fiducial registration error (FRE) during training.

Assuming that sSpc is the source space and tSpc is the target space. The Pre-CT image, the segmentation masks, and the fiducial points in sSpc are warped to tSpc by using the corresponding DDFs (note that one DDF is used for the images and masks and the other for the fiducial points), and the results are denoted as $Pre_{sSpc-tSpc}$, $Mask_{sSpc-tSpc}$, and $FidV_{sSpc-tSpc}$. Then, $Pre_{sSpc-tSpc}$, $Mask_{sSpc-tSpc}$, and $FidV_{sSpc-tSpc}$ are transferred back to sSpc using the corresponding DDF, and the results are denoted as $Pre_{sSpc-tSpc-sSpc}$, $Mask_{sSpc-tSpc-sSpc}$, and $FidV_{sSpc-tSpc-sSpc}$, respectively. The training objective for $NET_{sSpc-tSpc}$ can be constructed by using similarity measurements between the target object in tSpc (denoted as $O_{tSpc}$) and the source object that has been transferred to tSpc from sSpc (denoted as $O_{sSpc-tSpc}$). Specifically, the multiscale soft probabilistic Dice (MSPDice) between $Mask_{tSpc}$ and $Mask_{sSpc-tSpc}$, which is denoted as $MSPDice(Mask_{tSpc}, Mask_{sSpc-tSpc})$, is used to measure the similarity of the segmentation masks. The multiscale soft probabilistic Dice is less sensitive to the class imbalance in the segmentation tasks and is more appropriate for measuring label similarity in the context of image registration. The similarity between $FidV_{tSpc}$ and $FidV_{sSpc-tSpc}$ is measured by the mean fiducial registration error $FRE(FidV_{tSpc}, FidV_{sSpc-tSpc})$, which is calculated as the average Euclidean distance between the vertices in $FidV_{tSpc}$ and the corresponding vertices in $FidV_{sSpc-tSpc}$. The Post-CT images cannot be used for calculating intensity-based loss due to the artifacts, thus the normalized cross-correlation (NCC) between $Pre_{tSpc}$ and $Pre_{sSpc-tSpc}$, which is denoted as $NCC(Pre_{tSpc}, Pre_{sSpc-tSpc})$, is used to measure the similarity between the warped source image and the target image. A cycle-consistency loss is used for regularizing the transformations. It imposes inverse consistency between the objects in the two spaces and has been shown to reduce folding problems. The cycle-consistency loss $CycConsis_{sSpc-tSpc}$ measures the similarity between the original source objects in the source space and the source objects that have been transferred from the source space to the target space and then transferred back to the source space, which is calculated as $MSPDice(Mask_{sSpc}, Mask_{sSpc-tSpc-sSpc})+2×FRE(FidV_{sSpc}, FidV_{sSpc-tSpc-sSpc})+0.5×NCC(Pre_{sSpc}, Pre_{sSpc-tSpc-sSpc})$. Furthermore, the DDF from the source space to the target space $DDF_{sSpc-tSpc}$ is regularized using bending energy, which is denoted as $BendE(DDF_{sSpc-tSpc})$. The learnable parameters of the registration network $NET_{sSpc-tSpc}$ (except for the biases) are regularized by an L2 term, which is denoted as $L2(NET_{sSpc-tSpc})$. To summarize, the training objective for the networks is the weighted sum of the loss terms listed in Table 1; wherein the weights have been selected empirically by looking at training performance on a small number of epochs.

TABLE 1

| Loss terms that are used to train the model. | | |
| --- | --- | --- |
| Loss | Definition | Weight |
| MSPDice | $MSPDice(Mask_{post}, Mask_{atlas-post})$ + $MSPDice(Mask_{atlas}, Mask_{post-atlas})$ | 1 |
| Mean FRE | $\overline{FRE}(FidV_{post}, FidV_{atlas-post})$ + $\overline{FRE}(FidV_{atlas}, FidV_{post-atlas})$ | 2 |
| NCC | $NCC(Pre_{post}, Atlas_{atlas-post})$ + $NCC(Atlas_{atlas}, Pre_{post-atlas})$ | 0.5 |
| CycConsis | $CycConsis_{atlas-post} + CycConsis_{post-atlas}$ | 0.5 |
| BendE | $BendE(DDF_{atlas-post})$ + $BendE(DDF_{post-atlas})$ | 0.5 |
| L2 | $L2(NET_{atlas-post}) + L2(NET_{post-atlas})$ | 0.0001 |

Network Architecture: The registration networks in the model are adapted from the network architecture proposed by Hu et al. and Ghavami et al. As shown in FIG. 3, $NET_{sSpc-tSpc}$, which is tasked with generating a DDF for warping the source image S to the target image T, is composed of a Global-net and a Local-net. After receiving the concatenation of S and T, the Global-net generates an affine transformation matrix. S is warped to T by using this affine transformation and the resulting image is denoted as S'. Then, the Local-net takes the concatenation of S' and T to generate a non-rigid local DDF. The affine transformation and the local DDF are composed to produce the output DDF. The details about the Global-net and Local-net can be found in Hu et al. The Global-net is a 3D convolutional neural network with three down-sampling blocks, followed by an output block that maps the extracted image information to the affine transformation parameters. The Local-net is a 3D convolutional neural network based on an adapted U-network architecture with three down-sampling blocks, followed by three up-sampling blocks. $NET_{sSpc-tSpc}$ is trained end-to-end, i.e., the Global-net and the Local-net are trained together using the same loss function which is the weighted sum of the loss terms listed in Table 1.

Evaluation: As shown in FIG. 2C, at the inference phase, given a new Post-CT image $Post_{post}$, the ICA in $Post_{post}$ can be segmented by warping $Mesh_{atlas}$ to $PostImg_{post}$ using the DDF generated by the trained network. The resulting segmentation mesh of the ICA is denoted as $Mesh_{atlas-post}$. $Mesh_{post}$ is used as the ground truth for comparison. As $Mesh_{atlas}$ and $Mesh_{post}$ are the outputs of the ASM method, both of them have a predefined number of vertices, and the vertices of $Mesh_{atlas}$ and $Mesh_{post}$ have a one-to-one correspondence. There are 3344, 3132, and 2852 vertices on the ST, SV, and MD mesh surfaces, respectively, for a total of 9328 vertices. Point-to-point error (P2PE), computed as the Euclidean distance in millimeters, between the corresponding vertices on Mesh atlas-post and Mesh post are used to quantify the accuracy of the segmentation and registration. The P2PEs between the corresponding vertices on Mesh post and the meshes generated by cGANs+ASM are calculated and serve as values that are used to compare the novel method with the state of the art (SOTA). The method proposed in Hu et al., which uses a unidirectional registration network trained with the MSPDice loss and the regularization loss, is used as a baseline for comparison. In addition to the MSPDice loss and the regularization loss, the training objective also includes the FRE loss, NCC loss, and the cycle-consistency loss. An ablation study is conducted to analyze how these loss terms affect the performance of the networks.

Experiments

The 624 ears are partitioned into 465 ears for training, 66 ears for validation, and 93 ears for testing. The partition is random, with the constraint that ears of the same object cannot be used in both training and testing. Augmentation is applied to the training set by rotating each image by 6 random angles in the range of −25 and 25 degrees about the x-, y-, and z-axis. The training images are blurred by applying a Gaussian filter with a kernel size selected randomly from {0, 0.5, 1.0, 1.5} with equal probability. This results in a training set expanded to 8835 images. Each image is clipped between its 5th and 95th intensity percentiles, and the intensity values are rescaled to −1 to 1. A batch size of 1 is used, at each training step, 30% of the vertices on the ICA meshes are randomly sampled and used as the fiducial points for calculating the FRE loss.

Results

Figures 4A, 4B:
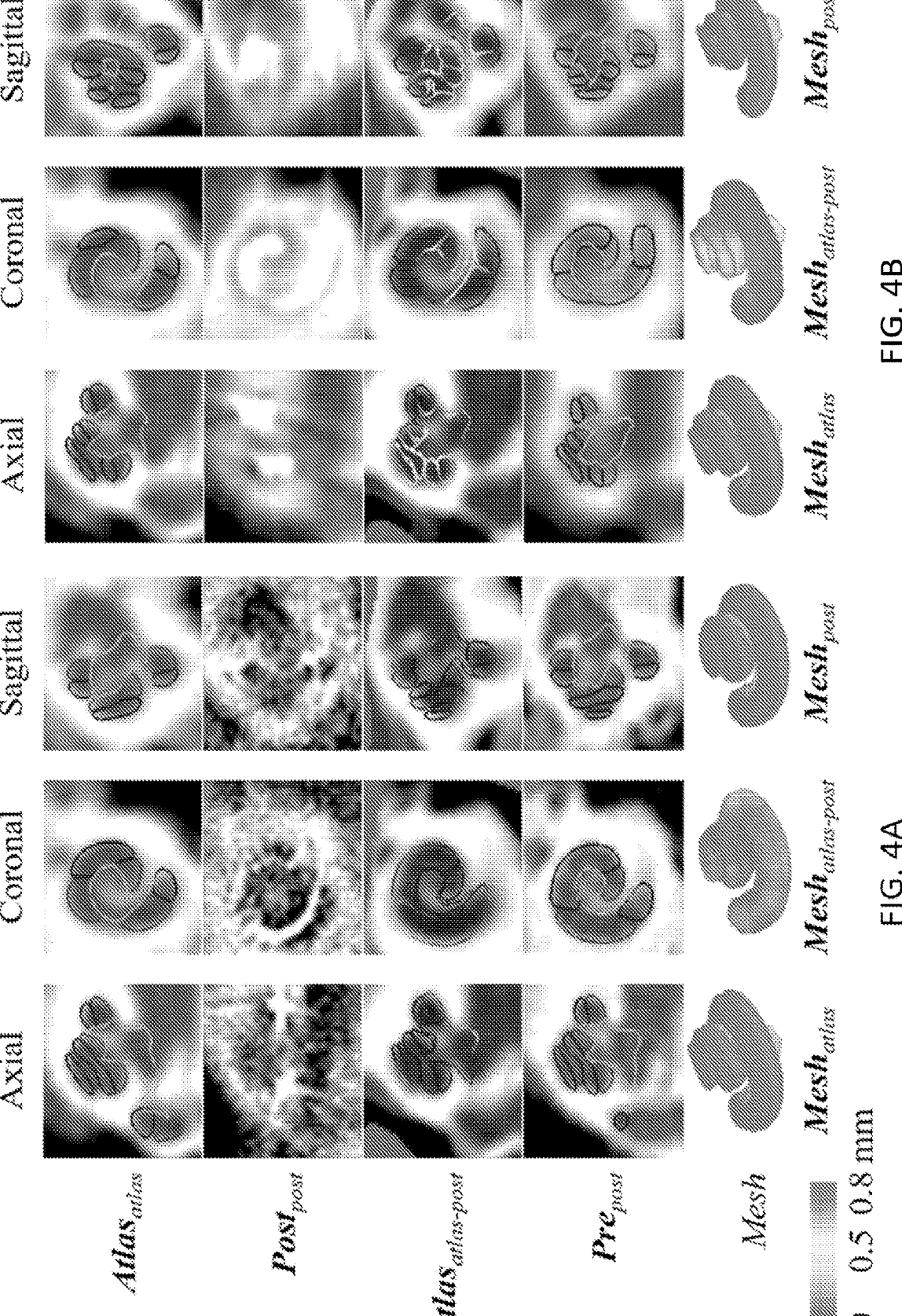
FIGS. 4A-4B show two example cases in which the method leads to (FIG. 4A) good and (FIG. 4B) poor results according to embodiments of the invention.

FIGS. 4A-4B show two cases for which the method leads to (FIG. 4A) good and (FIG. 4B) poor results. For each case, the first row shows three orthogonal views of the original atlas image in the atlas space. The second row shows the Post-CT image. The third row shows the atlas image registered to the Post-CT image. The fourth row shows the paired Pre-CT image of the Post-CT image. The warped atlas image (third row) should be as similar as possible to the Pre-CT image (fourth row). The last row shows the original segmentation mesh in the atlas image ($Mesh_{atlas}$), the segmentation mesh in the Post-CT image generated using the method ($Mesh_{atlas-post}$), and the ground truth mesh in the Post-CT image ($Mesh_{post}$). For $Mesh_{atlas}$ and $Mesh_{post}$, the ST, the SV, and the MD are shown in red, blue, and green, respectively. Mesh atlas-post is color-coded with the P2PE at each vertex on the mesh surfaces. Both these cases illustrate the severity of the artifact introduced by the implant. In the second case, the cochlea is barely visible.

Figures 5A, 5B:
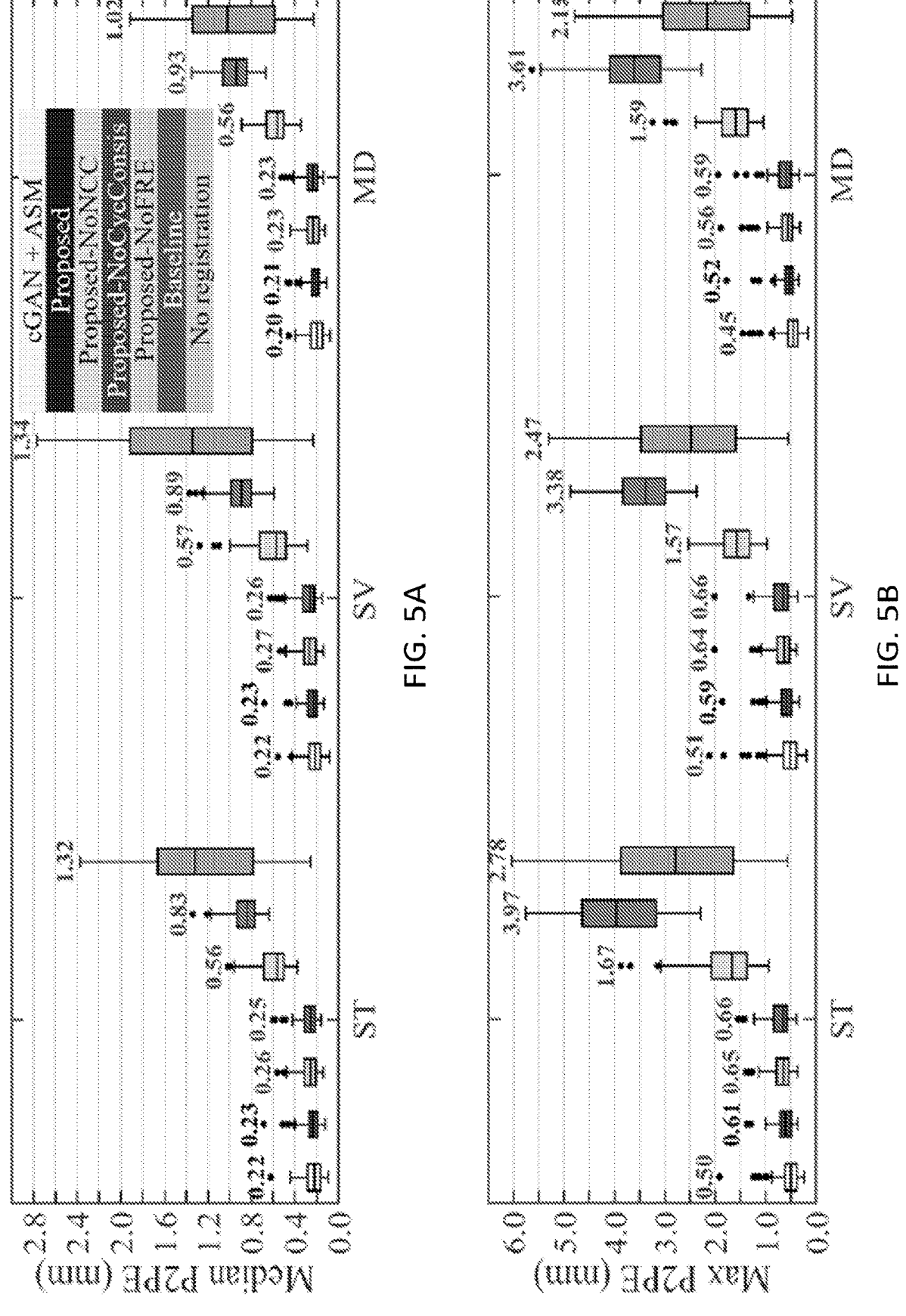
FIGS. 5A-5C show boxplots of (FIG. 5A) the median, (FIG. 5B) the Max, and (FIG. 5C) the STD of the P2PEs, according to embodiments of the invention. Boxplots from the left-hand side to the right-hand side are respectively for "cGAN+ASM", "Novel", "Novel-NoNCC", "Novel-No- CycConsis", "Novel-NoFRE", "Baseline", and "No registration", for each of ST, SV and MD.
Figure 5C:
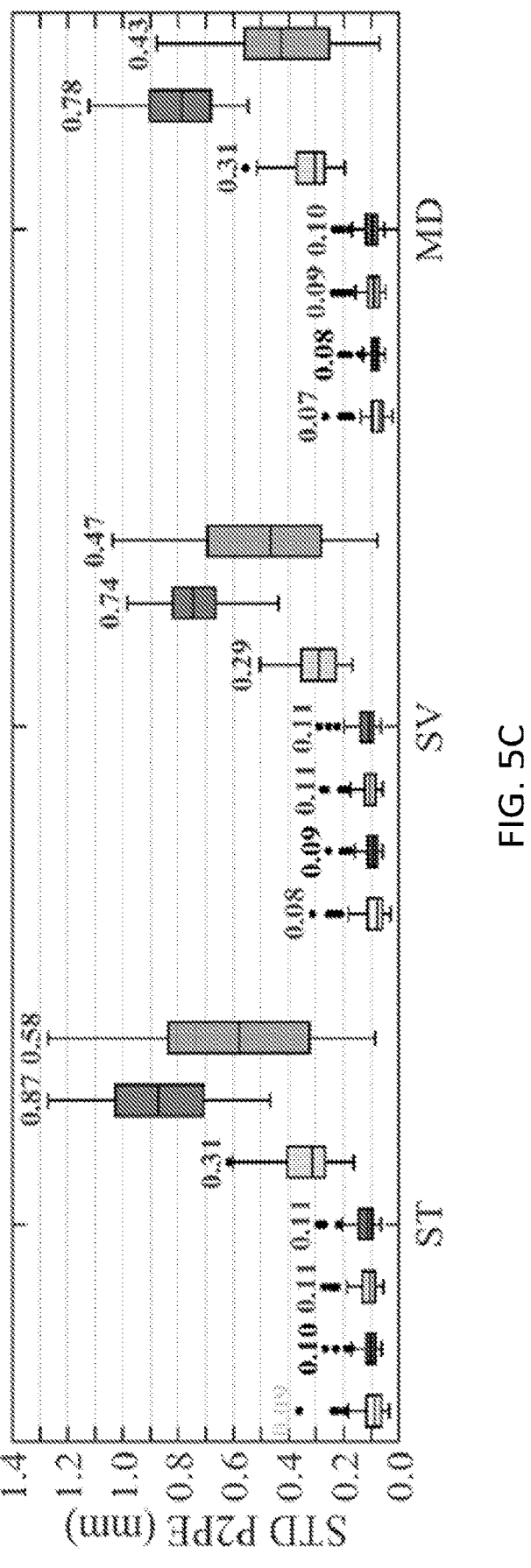

For each testing ear, the P2PEs of the vertices on the mesh surfaces of the ST, the SV, and the MD are calculated respectively. The maximum (Max), median, and standard deviation (STD) of the P2Pes are calculated. FIGS. 5A-5C show the boxplots of these statistics for the 93 testing ears. "cGAN+ASM" denotes the results of the SOTA. "Novel" denotes the results of the method according to the invention. "Novel-NoNCC", "Novel-NoCycConsis", and "Novel-NoFRE" denote the results of the novel networks trained without using the NCC loss, the cycle-consistency loss, and the FRE loss. "Baseline" denotes the results of the baseline method. "No registration" denotes the P2PEs between the vertices on the mesh surfaces in the original atlas space and the Post-CT space. Two-sided and one-sided Wilcoxon signed-rank tests between the "Novel" group and the other groups are performed. The p-values have been corrected using the Holm-Bonferroni method. The median values for each group are shown on top of the boxplots, in which red denotes that both the two-sided and the one-sided tests are significant, cyan denotes that only the two-sided test is significant, and blue denotes that the two-sided test is not significant. The results show that the networks trained using all of the novel loss terms achieve a significantly lower segmentation error compared to the baseline method and the networks that are not trained using all of the loss terms. The method according to the invention produces results that are similar to those obtained with the SOTA in terms of the medians of the segmentation error. The Max of the segmentation error and the STD of the segmentation error for the SV and MD remain slightly superior to those obtained with the SOTA.

As mentioned earlier, the SOTA is a two-step process: (1) generate a synthetic Pre-CT image from a Post-CT image with cGANs trained for this purpose and (2) apply an ASM method to the synthetic image. Step 2 requires the very accurate registration of an atlas to the image to be segmented to initialize the ASM. This is achieved through an affine and then a non-rigid intensity-based registration in a volume-of-interest that includes the inner ear. Step 1 takes about 0.3 s while step 2 takes on average 75 s. The novel method according to the invention only requires providing a volume-of-interest that includes the inner ear to the networks and inference time is also about 0.3 s. Segmentation is thus essentially instantaneous with the novel method while it takes over a minute with the SOTA. This is of importance for clinical deployment and end-user acceptance.

In sum, the exemplary example discloses networks capable of performing image registration between artifact-affected CT images and an artifact-free atlas image, which is a very challenging task because of the severity of the artifact introduced by the implant. Because maintaining point-to-point correspondence between meshes in the atlas and meshes in the segmented Post-CT images is needed, a point-to-point loss is introduced, which, to the best of inventors' knowledge, has not yet been reported. The experiments have shown that this loss is critical to achieve results that are comparable to those obtained with the SOTA that relies on an ASM fitted to a preoperative image synthesized from a post-operative image. By design, ASM methods always produce plausible shapes. It is observed that with the point-to-point loss, the network also produces plausible shapes even when the images are of very poor quality (see FIG. 4B). Thanks to the point-to-point loss, the network has been able to learn the shape of the cochlea and can fit this shape to partial information in the post-operative image. More experiments are ongoing to verify this hypothesis.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the invention pertains without departing from its spirit and scope. Accordingly, the scope of the invention is defined by the appended claims rather than the foregoing description and the exemplary embodiments described therein.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

LIST OF REFERENCES

[1]. What is a Cochlear Implant, https://www.fda.gov/medical-devices/cochlear-implants/what-cochlear-implant, last accessed 2020/11/17.

[2]. Image-guided Cochlear Implant Programming (IGCIP), https://clinicaltrials.gov/ct2/show/NCT03306082, last accessed 2020 Nov. 17.

[3]. Noble, J. H. et al.: Automatic segmentation of intracochlear anatomy in conventional CT. IEEE Transactions on Biomedical Engineering 58(9), 2625-2632 (2011).

[4]. Wang, J. et al.: Metal artifact reduction for the segmentation of the intra cochlear anatomy in CT images of the ear with 3D-conditional GANs. Medical Image Analysis 58, 101553 (2019).

[5]. Wang, J. et al.: Conditional generative gdversarial networks for metal artifact reduction in CT images of the ear. In: Frangi, A. et al. (eds) Medical Image Computing and Computer Assisted Intervention—MICCAI 2018. Lecture Notes in Computer Science, vol. 11070, pp. 1-3. Springer, Cham (2018).

[6]. Mirza, M., Osindero, S.: Conditional generative adversarial nets. arXiv:1411.1784 (2014).

[7]. Isola, P. et al.: Image-to-image translation with conditional adversarial networks. In Proceedings of the 2017 IEEE Conference on Computer Vision and Pattern Recognition (CVPR), pp. 1125-1134 (2017).

[8]. Pelosi, S. et al.: Analysis of intersubject variations in intracochlear and middle ear surface anatomy for cochlear implantation. Otology & Neurotology 34(9), 1675-1680 (2013).

[9]. Christensen, G. E. and Johnson, H. J.: Consistent image registration. IEEE Transactions on Medical Imaging 20(7), 568-582 (2001).

[10]. Milletari, F., Navab, N., Ahmadi, S.: V-Net: Fully convolutional neural networks for volumetric medical image segmentation. In: 2016 Fourth International Conference on 3D Vision (3DV), pp. 565-571 (2016).

[11]. Hu, Y. et al. Weakly-supervised convolutional neural networks for multimodal image registration. Medical Image Analysis 49, 1-13 (2018).

[12]. Kim, B. et al.: Unsupervised deformable image registration using cycle-consistent CNN. In: Shen D. et al. (eds) Medical Image Computing and Computer Assisted Intervention—MICCAI 2019. Lecture Notes in Computer Science, vol. 11769, pp. 166-174. Springer, Cham (2019).

[13]. Rueckert, D. et al.: Nonrigid registration using free-form deformations: Application to breast MR images. IEEE Transactions on Medical Imaging 18(8), 712-721 (1999).

[14]. Hu, Y. et al.: Label-driven weakly-supervised learning for multimodal deformable image registration," In: 2018 IEEE 15th International Symposium on Biomedical Imaging (ISBI), pp. 1070-1074 (2018).

[15]. Ghavami, N. et al.: Automatic slice segmentation of intraoperative transrectal ultrasound images using convolutional neural networks. In: Fei, B., Webster III, R. J. (eds) Proceedings Volume 10576, Medical Imaging 2018: Image-Guided Procedures, Robotic Interventions, and Modeling, 1057603 (2018).

[16]. Holm, S.: A simple sequentially rejective multiple test procedure. Scandinavian Journal of Statistics 6(2), 65-70 (1979).

What is claimed is:

1. A method for segmentation of structures of interest (SOI) in a computed tomography (CT) image post-operatively acquired from an implant user in a region of interest in which an implant is implanted, comprising:

providing an atlas image, a dataset and networks, wherein the dataset comprises a plurality of CT image pairs, randomly partitioned into a training set, a validation set, and a testing set, wherein each CT image pair has a pre-implantation CT (Pre-CT) image and a post-implantation CT (Post-CT) image respectively acquired in a region of a respective implant recipient before and after an implant is implanted in the region, so that the Pre-CT image and the Post-CT image of each CT image pair are an artifact-free CT image and an artifact-affected CT image, respectively; wherein the atlas image is a Pre-CT image of the region of a subject that is not in the plurality of CT image pairs; and wherein the networks comprises a first network for registering the atlas image to each Post-CT image and a second network for registering each Post-CT image to the atlas image;

training the networks with the plurality of CT image pairs, so as to learn to register the artifact-affected CT images and the atlas image with assistance of the paired artifact-free CT images;

inputting the CT image post-operatively acquired from the implant user to the trained networks to generate a dense deformation field (DDF) from the input Post-CT image to the atlas image; and warping a segmentation mesh of the SOI in the atlas image to the input Post-CT image using the DDF so as to generate the segmentation mesh of the SOI in the input Post-CT image, wherein the segmentation mesh of the SOI in the atlas image is generated by applying an active shape model-based (ASM) method to the atlas image.

2. The method of claim 1, wherein said providing the dataset comprises, for each CT image pair:

rigidly registering the Pre-CT image to the Post-CT image; and aligning the registered Pre-CT and Post-CT image pair to the atlas image so that anatomical structures in the region of the respective implant recipient are roughly in the same spatial location and orientation.

3. The method of claim 2, wherein said providing the dataset further comprises, for each CT image pair:

applying the ASM method to the registered Pre-CT image to generate a segmentation mesh of the SOI in the registered Pre-CT image ($Mesh_{pre}$);

transferring the segmentation mesh of the SOI in the registered Pre-CT image ($Mesh_{pre}$) to the Post-CT image, so as to generate a segmentation mesh of the SOI in the Post-CT image ($Mesh_{post}$); and converting the segmentation mesh of the SOI in the Post-CT image ($Mesh_{post}$) to segmentation masks of the SOI in the Post-CT image ($Seg_{post}$).

4. The method of claim 1, wherein all of the images are resampled to an isotropic voxel size, and cropped with images of 3D voxels containing the structures of interest.

5. The method of claim 1, wherein said providing the dataset comprises applying image augmentation to the training set by rotating each image by a plurality of small random angles in the range of −25 and 25 degrees about the x-axis, y-axis, and z-axis, to create additional training images from each original image.

6. The method of claim 1, wherein the networks have network architecture in which $NET_{sSpc\text{-}tSpc}$, designed for generating a DDF for warping a source image S to a target image T, comprises a Global-net and a Local-net, wherein the network architecture is configured such that after receiving the concatenation of S and T, the Global-net generates an affine transformation matrix; S is warped to T by using the affine transformation to generate an image S'; the Local-net takes the concatenation of S' and T to generate a non-rigid local DDF; and the affine transformation and the local DDF are composed to produce an output DDF.

7. The method of claim 6, wherein said training the networks comprises:

inputting a concatenation of the atlas image ($\text{Atlas}_{atlas}$) and each Post-CT image ($\text{Post}_{post}$) into the networks so that the first network ($\text{NET}_{atlas\text{-}post}$) generates a DDF from the atlas space to the Post-CT space ($\text{DDF}_{atlas\text{-}post}$) and the second network ($\text{NET}_{post\text{-}atlas}$) generates a DDF from the Post-CT space to the atlas space ($\text{DDF}_{post\text{-}atlas}$);

warping the Pre-CT image ($\text{Pre}_{sSpc}$), the segmentation masks ($\text{Mask}_{sSpc}$), and the fiducial vertices ($\text{FidV}_{sSpc}$) in a source space to a target space by using the corresponding DDFs, to generate $\text{Pre}_{sSpc\text{-}tSpc}$, $\text{Mask}_{sSpc\text{-}tSpc}$, and $\text{FidV}_{sSpc\text{-}tSpc}$; and transferring $\text{Pre}_{sSpc\text{-}tSpc}$, $\text{Mask}_{sSpc\text{-}tSpc}$, and $\text{FidV}_{sSpc\text{-}tSpc}$ back to sSpc using the corresponding DDF, to generate $\text{Pre}_{sSpc\text{-}tSpc\text{-}sSpc}$, $\text{Mask}_{sSpc\text{-}tSpc\text{-}sSpc}$, and $\text{FidV}_{sSpc\text{-}tSpc\text{-}sSpc}$, respectively, wherein $O_{xSpc}$ denotes an object O in the x space, sSpc and tSpc respectively denote the source and target spaces.

8. The method of claim 7, wherein $\text{FidV}_{atlas}$ and $\text{FidV}_{post}$ are the fiducial vertices randomly sampled from $\text{Mesh}_{atlas}$ and $\text{Mesh}_{post}$ on the fly for calculating the fiducial registration error during training.

9. The method of claim 7, wherein the training objective for $\text{NET}_{sSpc\text{-}tSpc}$ is constructed using measurements of similarity between a target object in tSpc ($O_{tSpc}$) and a source object that is transferred to tSpc from sSpc ($O_{sSpc\text{-}tSpc}$).

10. The method of claim 9, wherein the training objective for the networks is a weighted sum of loss terms of MSPDice, Mean FRE, NCC, CycConsis, BendE, and L2, wherein:

$\text{MSPDice}=\text{MSPDice}(\text{Mask}_{post}, \text{Mask}_{atlas\text{-}post})+\text{MSPDice}$ $(\text{Mask}_{atlas}, \text{Mask}_{post\text{-}atlas})$, wherein MSPDice $(\text{Mask}_{tSpc}, \text{Mask}_{sSpc\text{-}tSpc})$ is a multiscale soft probabilistic Dice between $\text{Mask}_{tSpc}$ and $\text{Mask}_{sSpc\text{-}tSpc}$ that measures the similarity of the segmentation masks between $\text{Mask}_{tSpc}$ and $\text{Mask}_{sSpc\text{-}tSpc}$;

Mean $\text{FRE}=\text{FRE}(\text{FidV}_{post}, \text{FidV}_{atlas\text{-}post})+\text{FRE}(\text{FidV}_{atlas}, \text{FidV}_{post\text{-}atlas})$, wherein $\text{FRE}(\text{FidV}_{tSpc}, \text{FidV}_{sSpc\text{-}tSpc})$ is a mean fiducial registration error that measures the similarity of the fiducial vertices between $\text{FidV}_{tSpc}$ and $\text{FidV}_{sSpc\text{-}tSpc}$, and is calculated as the average Euclidean distance between the fiducial vertices in $\text{FidV}_{tSpc}$ and the corresponding vertices in $\text{FidV}_{sSpc\text{-}tSpc}$;

$\text{NCC}=\text{NCC}(\text{Pre}_{post}, \text{Atlas}_{atlas\text{-}post})+\text{NCC}(\text{Atlas}_{atlas}, \text{Pre}_{post\text{-}atlas})$, wherein $\text{NCC}(\text{Preg}_{tSpc}, \text{Pre}_{sSpc\text{-}tSpc})$ is a normalized cross-correlation between $\text{Pre}_{tSpc}$ and $\text{Pre}_{sSpc\text{-}tSpc}$ that measures the similarity between the warped source image and the target image;

$\text{CycConsis}=\text{CycConsis}_{atlas\text{-}post}+\text{CycConsis}_{post\text{-}atlas}$, wherein $\text{CycConsis}_{sSpc\text{-}tSpc}$ is a cycle-consistency loss that measures the similarity between the original source objects in the source space and the source objects that are transferred from the source space to the target space and then transferred back to the source space, wherein $\text{CycConsis}_{sSpc\text{-}tSpc}=\text{MSPDice}(\text{Mask}_{sSpc}, \text{Mask}_{sSpc\text{-}tSpc\text{-}sSpc})+2\times\text{FRE}(\text{FidV}_{sSpc}, \text{FidV}_{sSpc\text{-}tSpc\text{-}sSpc})+0.5\times\text{NCC}(\text{Pre}_{sSpc}, \text{Pre}_{sSpc\text{-}tSpc\text{-}sSpc})$;

$\text{BendE}=\text{BendE}(\text{DDF}_{atlas\text{-}post})+\text{BendE}(\text{DDF}_{post\text{-}atlas})$, wherein $\text{BendE}(\text{DDF}_{sSpc\text{-}tSpc})$ is a bending loss for which the DDF from the source space to the target space $\text{DDF}_{sSpc\text{-}tSpc}$ is regularized using bending energy; and $\text{L2}=\text{L2}(\text{NET}_{atlas\text{-}post})+\text{L2}(\text{NET}_{post\text{-}atlas})$, wherein $\text{L2}(\text{NET}_{sSpc\text{-}tSpc})$ is a L2 loss for which the learnable parameters of the registration network $\text{NET}_{sSpc\text{-}tSpc}$ are regularized by an L2 term.

11. The method of claim 1, wherein the region of interest includes ear, brain, heart, or other organs of a living subject, wherein the structures of interest comprise anatomical structures in the region of interest.

12. The method of claim 11, wherein the anatomical structures comprise intracochlear anatomy (ICA).

13. The method of claim 1, wherein the implant is a cochlear implant, a deep brain stimulator, or a pacemaker.

14. A method for segmentation of structures of interest (SOI) in a computed tomography (CT) image post-operatively acquired with an implant user in a region of interest in which an implant is implanted, comprising:

inputting the post-operatively acquired CT (Post-CT) image to trained networks to generate a dense deformation field (DDF) from the input Post-CT image to an atlas image, wherein the atlas image is a Pre-CT image; and warping a segmentation mesh of the SOI in the atlas image to the input Post-CT image using the DDF so as to generate the segmentation mesh of the SOI in the input Post-CT image, wherein the segmentation mesh of the SOI in the atlas image is generated by applying an active shape model-based (ASM) method to the atlas image.

15. The method of claim 14, wherein the networks have network architecture in which $\text{NET}_{sSpc\text{-}tSpc}$, designed for generating a DDF for warping a source image S to a target image T, comprises a Global-net and a Local-net, wherein the network architecture is configured such that after receiving the concatenation of S and T, the Global-net generates an affine transformation matrix; S is warped to T by using the affine transformation to generate an image S'; the Local-net takes the concatenation of S' and T to generate a non-rigid local DDF; and the affine transformation and the local DDF are composed to produce an output DDF.

16. The method of claim 15, wherein the networks is trained with a dataset comprising a plurality of CT image pairs, randomly partitioned into a training set, a validation set, and a testing set, wherein each CT image pair has a pre-implantation CT (Pre-CT) image and a post-implantation CT (Post-CT) image respectively acquired in a region of a respective implant recipient before and after an implant is implanted in the region, so that the Pre-CT image and the Post-CT image of each CT image pair are an artifact-free CT image and an artifact-affected CT image, respectively.

17. The method of claim 16, wherein the Pre-CT image is rigidly registered to the Post-CT image for each CT image pair; and the registered Pre-CT and Post-CT image pair is aligned to the atlas image so that anatomical structures in the region of the respective implant recipient are roughly in the same spatial location and orientation.

18. The method of claim 17, wherein for each CT image pair, the ASM method is applied to the registered Pre-CT image to generate a segmentation mesh of the SOI in the registered Pre-CT image ($\text{Mesh}_{pre}$); the segmentation mesh of the SOI in the registered Pre-CT image ($Mesh_{pre}$) is transferred to the Post-CT image so as to generate a segmentation mesh of the SOI in the Post-CT image ($Mesh_{post}$); and the segmentation mesh of the SOI in the Post-CT image ($Mesh_{post}$) is converted to segmentation masks of the SOI in the Post-CT image ($Seg_{post}$).

19. The method of claim 18, wherein the networks are trained to learn to register the artifact-affected CT images and the atlas image with assistance of the paired artifact-free CT images.

20. The method of claim 19, wherein the networks is trained by:
   - inputting a concatenation of the atlas image ($Atlas_{atlas}$) and each Post-CT image ($Post_{post}$) into the networks so that the first network ($NET_{atlas-post}$) generates a DDF from the atlas space to the Post-CT space ($DDF_{atlas-post}$) and the second network ($NET_{post-atlas}$) generates a DDF from the Post-CT space to the atlas space ($DDF_{post-atlas}$);
   - warping the Pre-CT image ($Pre_{sSpc}$), the segmentation masks ($Mask_{sSpc}$), and the fiducial vertices ($FidV_{sSpc}$) in a source space to a target space by using the corresponding DDFs, to generate $Pre_{sSpc-tSpc}$, $Mask_{sSpc-tSpc}$, and $FidV_{sSpc-tSpc}$; and
   - transferring $Pre_{sSpc-tSpc}$, $Mask_{sSpc-tSpc}$, and $FidV_{sSpc-tSpc}$ back to sSpc using the corresponding DDF, to generate $Pre_{sSpc-tSpc-sSpc}$, $Mask_{sSpc-tSpc-sSpc}$, and $FidV_{sSpc-tSpc-sSpc}$, respectively,
   - wherein $O_{xSpc}$ denotes an object O in the x space, sSpc and tSpc respectively denote the source and target spaces.

21. The method of claim 20, wherein the training objective for $NET_{sSpc-tSpc}$ is constructed using measurements of similarity between a target object in tSpc ($O_{tSpc}$) and a source object that is transferred to tSpc from sSpc ($O_{sSpc-tSpc}$).

22. The method of claim 21, wherein the trained networks are characterized with a training objective that is a weighted sum of loss terms of MSPDice, Mean FRE, NCC, CycConsis, BendE, and L2, wherein:
   - MSPDice=MSPDice($Mask_{post}$, $Mask_{atlas-post}$)+MSPDice($Mask_{atlas}$, $Mask_{post-atlas}$), wherein MSPDice($Mask_{tSpc}$, $Mask_{sSpc-tSpc}$) is a multiscale soft probabilistic Dice between $Mask_{tSpc}$ and $Mask_{sSpc-tSpc}$ that measures the similarity of the segmentation masks between $Mask_{tSpc}$ and $Mask_{sSpc-tSpc}$;
   - Mean FRE=FRE($FidV_{post}$, $FidV_{atlas-post}$)+FRE($FidV_{atlas}$, $FidV_{post-atlas}$), wherein FRE($FidV_{tSpc}$, $FidV_{sSpc-tSpc}$) is a mean fiducial registration error that measures the similarity of the fiducial vertices between $FidV_{tSpc}$ and $FidV_{sSpc-tSpc}$, and is calculated as the average Euclidean distance between the fiducial vertices in $FidV_{tSpc}$ and the corresponding vertices in $FidV_{sSpc-tSpc}$;
   - NCC=NCC($Pre_{post}$, $Atlas_{atlas-post}$)+NCC($Atlas_{atlas}$, $Pre_{post-atlas}$), wherein NCC($Preg_{tSpc}$, $Pre_{sSpc-tSpc}$) is a normalized cross-correlation between $Pre_{tSpc}$ and $Pre_{sSpc-tSpc}$ that measures the similarity between the warped source image and the target image;
   - CycConsis=CycConsis$_{atlas-post}$+CycConsis$_{post-atlas}$, wherein CycConsis$_{sSpc-tSpc}$ is a cycle-consistency loss that measures the similarity between the original source objects in the source space and the source objects that are transferred from the source space to the target space and then transferred back to the source space, wherein CycConsis$_{sSpc-tSpc}$=MSPDice($Mask_{sSpc}$, $Mask_{sSpc-tSpc-sSpc}$)+2×FRE($FidV_{sSpc}$, $FidV_{sSpc-tSpc-sSpc}$)+0.5×NCC($Pre_{sSpc}$, $Pre_{sSpc-tSpc-sSpc}$);

- BendE=BendE($DDF_{atlas-post}$)+BendE($DDF_{post-atlas}$), wherein BendE($DDF_{sSpc-tSpc}$) is a bending loss for which the DDF from the source space to the target space $DDF_{sSpc-tSpc}$ is regularized using bending energy; and
   - L2=L2($NET_{atlas-post}$)+L2($NET_{post-atlas}$), wherein L2($NET_{sSpc-tSpc}$) is a L2 loss for which the learnable parameters of the registration network $NET_{sSpc-tSpc}$ are regularized by an L2 term.

23. A non-transitory tangible computer-readable medium storing instructions which, when executed by one or more processors, cause a system to perform the method of claim 1.

24. A system for segmentation of structures of interest (SOI) in a computed tomography (CT) image post-operatively acquired from an implant user in a region of interest in which an implant is implanted, comprising:
   - a trained networks for generating dense deformation fields (DDFs) in opposite directions; and
   - a microcontroller coupled with the trained networks and configured to generate a DDF from the post-operatively acquired CT (Post-CT) image to an atlas image; warp a segmentation mesh of the SOI in the atlas image to the Post-CT image using the DDF to generate a segmentation mesh of the SOI in the Post-CT image, wherein the segmentation mesh of the SOI in the atlas image is generated by applying an active shape model-based (ASM) method to the atlas image, wherein the atlas image is a Pre-CT image.

25. The system of claim 24, wherein the trained networks comprises networks having network architecture in which $NET_{sSpc-tSpc}$, designed for generating a DDF for warping a source image S to a target image T, comprises a Global-net and a Local-net, wherein the network architecture is configured such that after receiving the concatenation of S and T, the Global-net generates an affine transformation matrix; S is warped to T by using the affine transformation to generate an image S'; the Local-net takes the concatenation of S' and T to generate a non-rigid local DDF; and the affine transformation and the local DDF are composed to produce an output DDF.

26. The system of claim 25, wherein the microcontroller is further configured to train the network with a dataset comprising a plurality of CT image pairs, randomly partitioned into a training set, a validation set, and a testing set, wherein each CT image pair has a pre-implantation CT (Pre-CT) image and a post-implantation CT (Post-CT) image respectively acquired in a region of a respective implant recipient before and after an implant is implanted in the region, so that the Pre-CT image and the Post-CT image of each CT image pair are an artifact-free CT image and an artifact-affected CT image, respectively.

27. The system of claim 26, wherein the microcontroller is further configured to apply image augmentation to the training set by rotating each image by a plurality of small random angles in the range of −25 and 25 degrees about the x-axis, y-axis, and z-axis, to create additional training images from each original image.

28. The system of claim 27, wherein the microcontroller is further configured to:
   - rigidly register the Pre-CT image to the Post-CT image for each CT image pair; and
   - align the registered Pre-CT and Post-CT image pair to the atlas image so that anatomical structures in the region of the respective implant recipient are roughly in the same spatial location and orientation.

29. The system of claim 28, wherein the microcontroller is further configured to, for each CT image pair:

apply the ASM method to the registered Pre-CT image to generate a segmentation mesh of the SOI in the registered Pre-CT image ($\text{Mesh}_{pre}$);

transfer the segmentation mesh of the SOI in the registered Pre-CT image ($\text{Mesh}_{pre}$) to the Post-CT image, so as to generate a segmentation mesh of the SOI in the Post-CT image ($\text{Mesh}_{post}$); and convert the segmentation mesh of the SOI in the Post-CT image ($\text{Mesh}_{post}$) to segmentation masks of the SOI in the Post-CT image ($\text{Seg}_{post}$).

30. The system of claim 29, wherein the networks are trained to learn to register the artifact-affected CT images and the atlas image with assistance of the paired artifact-free CT images.

31. The system of claim 30, wherein the networks is trained by:

inputting a concatenation of the atlas image ($\text{Atlas}_{atlas}$) and each Post-CT image ($\text{Post}_{post}$) into the networks so that the first network ($\text{NET}_{atlas-post}$) generates a DDF from the atlas space to the Post-CT space ($\text{DDF}_{atlas-post}$) and the second network ($\text{NET}_{post-atlas}$) generates a DDF from the Post-CT space to the atlas space ($\text{DDF}_{post-atlas}$);

warping the Pre-CT image ($\text{Pre}_{sSpc}$), the segmentation masks ($\text{Mask}_{sSpc}$), and the fiducial vertices ($\text{FidV}_{sSpc}$) in a source space to a target space by using the corresponding DDFs, to generate $\text{Pre}_{sSpc-tSpc}$, $\text{Mask}_{sSpc-tSpc}$, and $\text{FidV}_{sSpc-tSpc}$; and transferring $\text{Pre}_{sSpc-tSpc}$, $\text{Mask}_{sSpc-tSpc}$, and $\text{FidV}_{sSpc-tSpc}$ back to sSpc using the corresponding DDF, to generate $\text{Pre}_{sSpc-tSpc-sSpc}$, $\text{Mask}_{sSpc-tSpc-sSpc}$, and $\text{FidV}_{sSpc-tSpc-sSpc}$, respectively, wherein $O_{xSpc}$ denotes an object O in the x space, sSpc and tSpc respectively denote the source and target spaces.

32. The system of claim 31, wherein the training objective for $\text{NET}_{sSpc-tSpc}$ is constructed using measurements of similarity between a target object in tSpc ($O_{tSpc}$) and a source object that is transferred to tSpc from sSpc ($O_{sSpc-tSpc}$).

33. The system of claim 32, wherein the trained networks are characterized with a training objective that is a weighted sum of loss terms of MSPDice, Mean FRE, NCC, CycConsis, BendE, and L2, wherein:

$\text{MSPDice}=\text{MSPDice}(\text{Mask}_{post}, \text{Mask}_{atlas-post})+\text{MSPDice}(\text{Mask}_{atlas}, \text{Mask}_{post-atlas})$, wherein $\text{MSPDice}(\text{Mask}_{tSpc}, \text{Mask}_{sSpc-tSpc})$ is a multiscale soft probabilistic Dice between $\text{Mask}_{tSpc}$ and $\text{Mask}_{sSpc-tSpc}$ that measures the similarity of the segmentation masks between $\text{Mask}_{tSpc}$ and $\text{Mask}_{sSpc-tSpc}$;

$\text{Mean FRE}=\text{FRE}(\text{FidV}_{post}, \text{FidV}_{atlas-post})+\text{FRE}(\text{FidV}_{atlas}, \text{FidV}_{post-atlas})$, wherein $\text{FRE}(\text{FidV}_{tSpc}, \text{FidV}_{sSpc-tSpc})$ is a mean fiducial registration error that measures the similarity of the fiducial vertices between $\text{FidV}_{tSpc}$ and $\text{FidV}_{sSpc-tSpc}$, and is calculated as the average Euclidean distance between the fiducial vertices in $\text{FidV}_{tSpc}$ and the corresponding vertices in $\text{FidV}_{sSpc-tSpc}$;

$\text{NCC}=\text{NCC}(\text{Pre}_{post}, \text{Atlas}_{atlas-post})+\text{NCC}(\text{Atlas}_{atlas}, \text{Pre}_{post-atlas})$, wherein $\text{NCC}(\text{Preg}_{tSpc}, \text{Pre}_{sSpc-tSpc})$ is a normalized cross-correlation between $\text{Pre}_{tSpc}$ and $\text{Pre}_{sSpc-tSpc}$ that measures the similarity between the warped source image and the target image;

$\text{CycConsis}=\text{CycConsis}_{atlas-post}+\text{CycConsis}_{post-atlas}$, wherein $\text{CycConsis}_{sSpc-tSpc}$ is a cycle-consistency loss that measures the similarity between the original source objects in the source space and the source objects that are transferred from the source space to the target space and then transferred back to the source space, wherein $\text{CycConsis}_{sSpc-tSpc}=\text{MSPDice}(\text{Mask}_{sSpc}, \text{Mask}_{sSpc-tSpc-sSpc})+2\times\text{FRE}(\text{FidV}_{sSpc}, \text{FidV}_{sSpc-tSpc-sSpc})+0.5\times\text{NCC}(\text{Pre}_{sSpc}, \text{Pre}_{sSpc-tSpc-sSpc})$;

$\text{BendE}=\text{BendE}(\text{DDF}_{atlas-post})+\text{BendE}(\text{DDF}_{post-atlas})$, wherein $\text{BendE}(\text{DDF}_{sSpc-tSpc})$ is a bending loss for which the DDF from the source space to the target space $\text{DDF}_{sSpc-tSpc}$ is regularized using bending energy; and $\text{L2}=\text{L2}(\text{NET}_{atlas-post})+\text{L2}(\text{NET}_{post-atlas})$, wherein $\text{L2}(\text{NET}_{sSpc-tSpc})$ is a L2 loss for which the learnable parameters of the registration network $\text{NET}_{sSpc-tSpc}$ are regularized by an L2 term.

34. The system of claim 24, wherein the region of interest includes ear, brain, heart, or other organs of a living subject, wherein the structures of interest comprise anatomical structures in region of interest.

35. The system of claim 34, wherein the anatomical structures comprise intracochlear anatomy (ICA).

36. The system of claim 24, wherein the implant is a cochlear implant, a deep brain stimulator, or a pacemaker.

* * * * *